(12) United States Patent
Kelfkens et al.

(10) Patent No.: US 12,510,295 B2
(45) Date of Patent: Dec. 30, 2025

(54) INLINE PARTICLE SIZE CONTROL FOR ROTARY DRUM DRIER RECYCLE MATERIAL

(71) Applicant: ARIES CLEAN TECHNOLOGIES LLC, Franklin, TN (US)

(72) Inventors: Renus Kelfkens, Franklin, TN (US); Mark Bauer, Franklin, TN (US)

(73) Assignee: ARIES CLEAN TECHNOLOGIES LLC, Franklin, TN (US)

( * ) Notice: Subject to any disclaimer, the term of this patent is extended or adjusted under 35 U.S.C. 154(b) by 165 days.

(21) Appl. No.: 18/303,561

(22) Filed: Apr. 19, 2023

(65) Prior Publication Data

US 2023/0303937 A1  Sep. 28, 2023
US 2025/0354752 A9  Nov. 20, 2025

Related U.S. Application Data

(63) Continuation-in-part of application No. 17/676,112, filed on Feb. 18, 2022, now Pat. No. 11,661,559.
(Continued)

(51) Int. Cl.
*F26B 1/00* (2006.01)
*B01J 8/18* (2006.01)
(Continued)

(52) U.S. Cl.
CPC ............ *F26B 1/005* (2013.01); *B01J 8/1809* (2013.01); *C10K 1/026* (2013.01); *C02F 11/12* (2013.01);
(Continued)

(58) Field of Classification Search
CPC ........ C10J 2300/0916; C10J 2300/1807; C10J 2300/0946; C10J 2300/0909;
(Continued)

(56) References Cited

U.S. PATENT DOCUMENTS 2,948,671 A  8/1960  Packie et al.
3,867,110 A  2/1975  Schora et al.
(Continued)

FOREIGN PATENT DOCUMENTS

BR  102014008655 A2 *  3/2016  ............ Y02W 30/91
CN  104163734 A *  11/2014
(Continued)

*Primary Examiner* — Imran Akram

(57) ABSTRACT

Apparatus and associated methods relate to drying a wet coated seed material stream comprising an incoming wet granular biosolids stream mixed with a controlled size dried seed material recycling stream to produce a moist air and pellet stream, separating an uncontrolled size dried pellet stream from the moist air and pellet stream, diverting a recycle portion of the uncontrolled size dried pellet stream to be recycled, diverting the remainder of the uncontrolled size dried pellet stream to an outlet, resizing oversized pellets from the recycle portion of the uncontrolled size dried pellet stream to produce the controlled size dried seed material recycling stream, and mixing the controlled size dried seed material recycling stream with the incoming wet granular biosolids stream to produce the wet coated seed material stream. Oversized pellets may be selected using a screen. The oversized pellets may be resized using a crusher inline with the recycle stream.

14 Claims, 21 Drawing Sheets

Related U.S. Application Data which is a continuation-in-part of application No. 16/922,824, filed on Jul. 7, 2020, now Pat. No. 11,279,894, which is a continuation of application No. 16/801,834, filed on Feb. 26, 2020, now Pat. No. 10,738,249, which is a continuation-in-part of application No. 16/723,538, filed on Dec. 20, 2019, now Pat. No. 10,696,913, which is a continuation-in-part of application No. 16/445,118, filed on Jun. 18, 2019, now Pat. No. 10,611,973.

(51) Int. Cl.
  *C02F 11/12* (2019.01)
  *C02F 11/121* (2019.01)
  *C10K 1/02* (2006.01)

(52) U.S. Cl.
  CPC ..... C02F 11/121 (2013.01); C10J 2300/0909 (2013.01); Y02W 10/40 (2015.05)

(58) Field of Classification Search
  CPC ............ C10J 2200/15; C10J 2300/0903; C10J 2300/0906; C10B 57/10; C10L 2290/08; C10L 2290/28; C10L 5/447; C10L 2200/0469; C10L 5/363
  See application file for complete search history.

(56) References Cited

U.S. PATENT DOCUMENTS

| | | | |
|---|---|---|---|
| 3,884,649 A | 5/1975 | Matthews | |
| 3,981,690 A | 9/1976 | Chen et al. | |
| 4,032,305 A | 6/1977 | Squires | |
| 4,057,402 A | 11/1977 | Patel et al. | |
| 4,146,369 A | 3/1979 | Flesch et al. | |
| 4,200,438 A | 4/1980 | Kaimann et al. | |
| 4,226,830 A | 10/1980 | Davis | |
| 4,284,528 A * | 8/1981 | Lancet | C10J 3/54 423/430 |
| 4,334,484 A | 6/1982 | Payne et al. | |
| 4,378,208 A | 3/1983 | Payne et al. | |
| 4,465,022 A | 8/1984 | Virr | |
| 4,469,050 A | 9/1984 | Korenberg | |
| 4,531,462 A | 7/1985 | Payne | |
| 4,589,356 A * | 5/1986 | Adams | F23K 1/00 110/232 |
| 4,589,357 A * | 5/1986 | Lincoln | F23G 5/02 110/232 |
| 4,592,762 A | 6/1986 | Babu et al. | |
| 4,608,059 A | 8/1986 | Kupfer et al. | |
| 4,684,375 A | 8/1987 | Morin et al. | |
| 4,691,846 A | 9/1987 | Cordell et al. | |
| 4,710,202 A | 12/1987 | Gohler et al. | |
| 4,725,288 A | 2/1988 | Bougard | |
| 4,799,937 A | 1/1989 | Nieminen | |
| 4,823,712 A | 4/1989 | Wormer | |
| 4,828,581 A | 5/1989 | Feldmann et al. | |
| 4,834,981 A | 5/1989 | Monte | |
| 4,848,249 A | 7/1989 | LePori et al. | |
| 4,968,325 A | 11/1990 | Black et al. | |
| 4,971,599 A | 11/1990 | Cordell et al. | |
| 5,059,404 A | 10/1991 | Mansour et al. | |
| 5,080,780 A | 1/1992 | Canzoneri et al. | |
| 5,411,714 A | 5/1995 | Wu et al. | |
| 5,570,645 A | 11/1996 | Garcia-Mallol | |
| 5,573,559 A | 11/1996 | Hillard et al. | |
| 5,620,488 A | 4/1997 | Hirayama et al. | |
| 5,637,182 A | 6/1997 | Mansour et al. | |
| 5,858,033 A | 1/1999 | Hirayama et al. | |
| 5,922,090 A | 7/1999 | Fujimura et al. | |
| 6,120,567 A | 9/2000 | Cordell et al. | |
| 6,149,765 A | 11/2000 | Mansour et al. | |
| 6,158,571 A | 12/2000 | Gosa | |
| 6,190,429 B1 | 2/2001 | Fujimura et al. | |
| 6,261,050 B1 | 7/2001 | Kuhns | |
| 6,548,197 B1 | 4/2003 | Chandran et al. | |
| 6,669,822 B1 | 12/2003 | Fujimara et al. | |
| 6,786,943 B1 | 9/2004 | Jaccard et al. | |
| 6,960,234 B2 | 11/2005 | Hassett | |
| 7,322,301 B2 | 1/2008 | Childs | |
| 7,793,601 B2 | 9/2010 | Davidson et al. | |
| 7,942,943 B2 | 5/2011 | Theegala | |
| 8,088,832 B2 | 1/2012 | Melnichuk et al. | |
| 8,673,181 B2 | 3/2014 | Gualy et al. | |
| 8,696,792 B2 | 4/2014 | Henningsen | |
| 8,888,874 B1 | 11/2014 | Borchert et al. | |
| 10,024,115 B1 | 7/2018 | Bollman et al. | |
| 2002/0112403 A1 | 8/2002 | Pope et al. | |
| 2002/0159929 A1 | 10/2002 | Kaneko et al. | |
| 2006/0165582 A1 * | 7/2006 | Brooker | C10J 3/84 423/414 |
| 2007/0245934 A1 | 10/2007 | Carman | |
| 2007/0266633 A1 | 11/2007 | Tsangaris et al. | |
| 2007/0270511 A1 | 11/2007 | Melnichuk et al. | |
| 2008/0049543 A1 | 2/2008 | Zimmerman et al. | |
| 2008/0085172 A1 | 4/2008 | Harman et al. | |
| 2009/0000195 A1 | 1/2009 | Graham | |
| 2009/0130003 A1 | 5/2009 | Koch et al. | |
| 2009/0158658 A1 | 6/2009 | Stadler et al. | |
| 2009/0173005 A1 | 7/2009 | Neumann | |
| 2009/0218424 A1 | 9/2009 | Hauserman | |
| 2009/0293303 A1 * | 12/2009 | Maestri | C10L 5/40 34/514 |
| 2009/0297417 A1 | 12/2009 | Sun et al. | |
| 2010/0040510 A1 | 2/2010 | Randhava et al. | |
| 2010/0040527 A1 | 2/2010 | Randhava et al. | |
| 2010/0154728 A1 | 6/2010 | Kemper et al. | |
| 2010/0196199 A1 * | 8/2010 | Vonplon | C02F 11/185 422/38 |
| 2010/0223848 A1 | 9/2010 | Heidenrich et al. | |
| 2010/0224835 A1 | 9/2010 | Chornet et al. | |
| 2011/0078951 A1 | 4/2011 | Blasiak et al. | |
| 2011/0114451 A1 | 5/2011 | Moreland et al. | |
| 2011/0189054 A1 | 8/2011 | Sheng | |
| 2011/0232191 A1 | 9/2011 | Diebold et al. | |
| 2011/0308155 A1 | 12/2011 | Paskach et al. | |
| 2012/0061618 A1 | 3/2012 | Santoianni et al. | |
| 2012/0134888 A1 * | 5/2012 | Blevins | B01J 19/242 422/162 |
| 2012/0145965 A1 * | 6/2012 | Simmons | C07C 29/152 422/162 |
| 2012/0213647 A1 | 8/2012 | Koch et al. | |
| 2012/0280181 A1 * | 11/2012 | Ruger | C10J 3/485 252/373 |
| 2013/0026417 A1 | 1/2013 | Paquet et al. | |
| 2013/0104880 A1 * | 5/2013 | Stuart | C13K 1/02 127/37 |
| 2013/0186810 A1 * | 7/2013 | Volini | C10K 1/002 210/150 |
| 2013/0327258 A1 | 12/2013 | Sato et al. | |
| 2014/0000496 A1 | 1/2014 | Sato et al. | |
| 2014/0037509 A1 | 2/2014 | Jiang et al. | |
| 2014/0158941 A1 | 6/2014 | Liu et al. | |
| 2014/0339346 A1 | 11/2014 | Koenig et al. | |
| 2015/0191386 A1 | 7/2015 | Mayrand | |
| 2016/0045841 A1 * | 2/2016 | Kaplan | B03C 1/00 429/49 |
| 2016/0138433 A1 | 5/2016 | Janicki | |
| 2017/0158975 A1 | 6/2017 | Jancok | |
| 2018/0142160 A1 * | 5/2018 | Lin | C10G 1/06 |
| 2018/0215076 A1 * | 8/2018 | Stuart | B29B 9/14 |
| 2020/0017788 A1 * | 1/2020 | Endo | C10L 5/363 |
| 2022/0260256 A1 | 8/2022 | Hamilton et al. | |

FOREIGN PATENT DOCUMENTS

| | | | |
|---|---|---|---|
| CN | 206556055 U | | 10/2017 |
| CN | 207754143 U | * | 8/2018 |
| JP | 2007231062 A | | 9/2007 |

(56) References Cited

FOREIGN PATENT DOCUMENTS

| WO | 2010071422 A2 | 6/2010 | | |
|---|---|---|---|---|
| WO | WO-2014125422 A1 | * | 8/2014 | ............. C08K 3/014 |

* cited by examiner

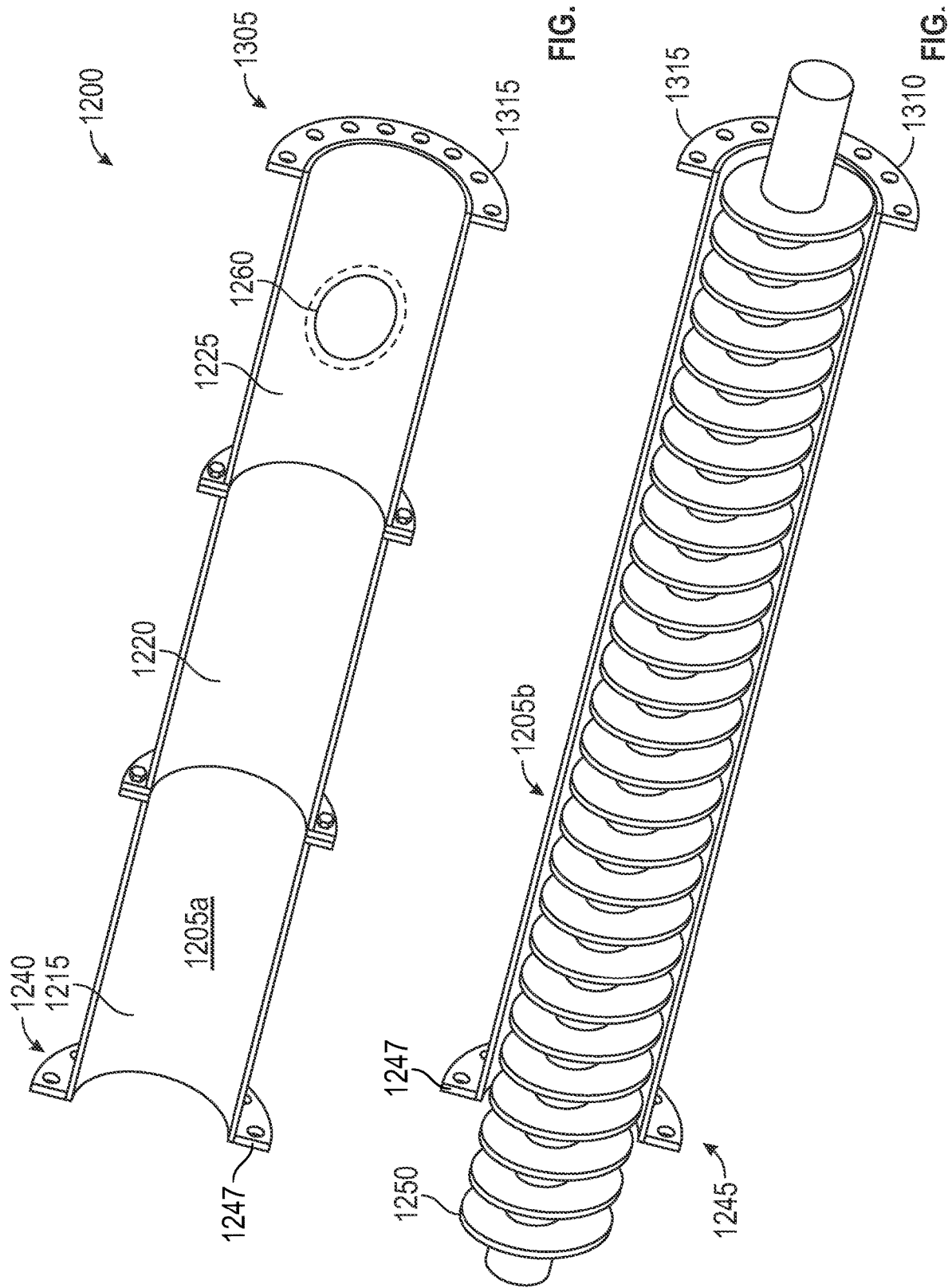

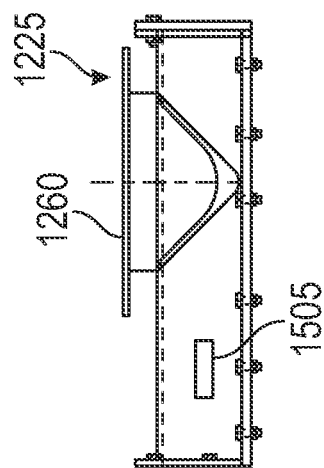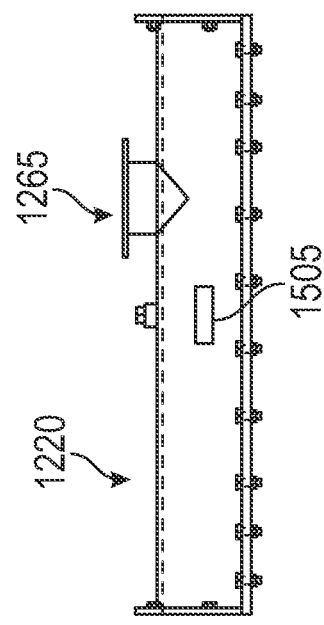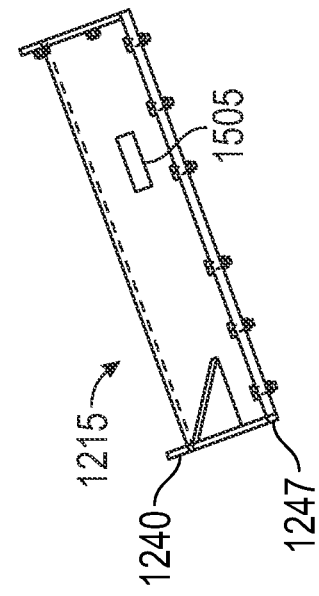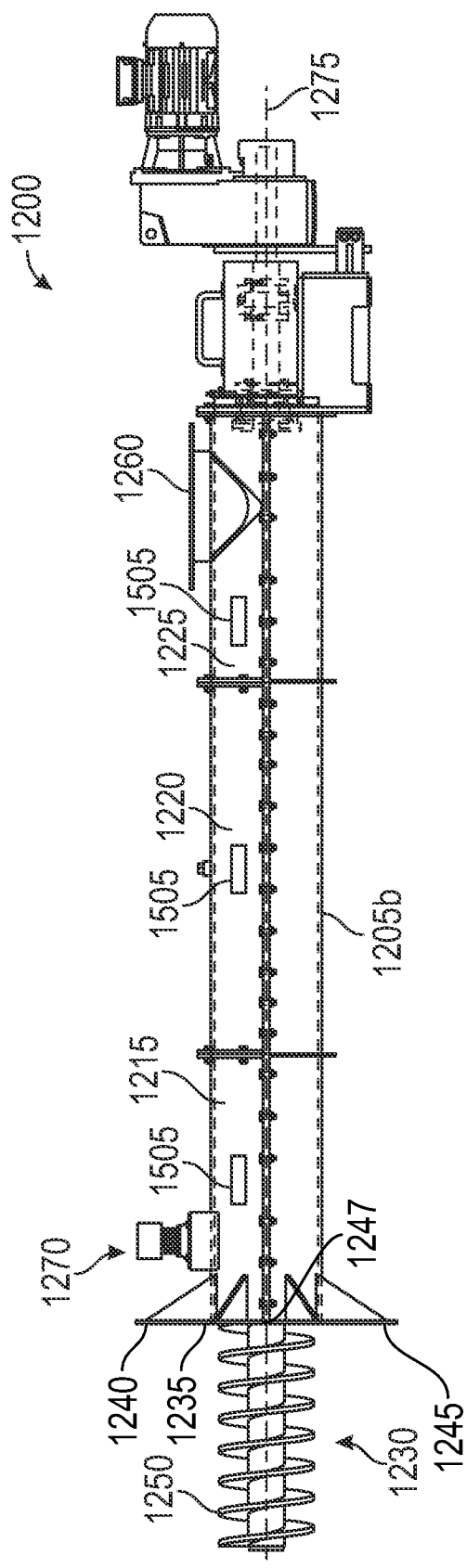
FIG. 15A
FIG. 15B

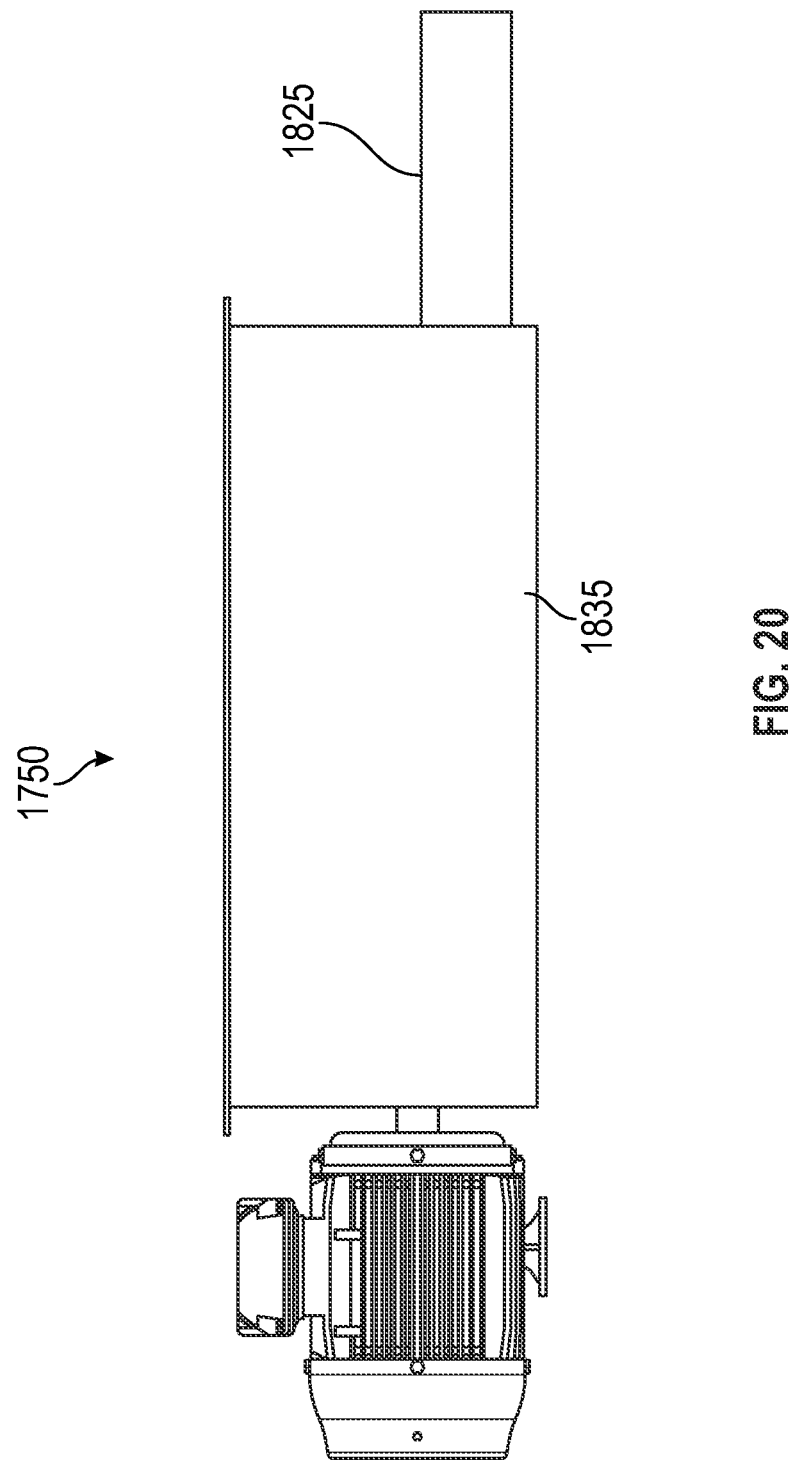

INLINE PARTICLE SIZE CONTROL FOR ROTARY DRUM DRIER RECYCLE MATERIAL

CROSS REFERENCE TO RELATED APPLICATIONS

This Application is a Continuation-in-part of U.S. application Ser. No. 17/676,112 filed Feb. 18, 2022, which is a Continuation-in-part of U.S. application Ser. No. 16/922,824 filed Jul. 7, 2020 (now U.S. Pat. No. 11,279,894 issued Mar. 22, 2022), which is a Continuation of U.S. application Ser. No. 16/801,834 filed Feb. 26, 2020 (now U.S. Pat. No. 10,738,249 issued Aug. 11, 2020), which is a Continuation-in-part Applications of U.S. application Ser. No. 16/723,538 filed Dec. 20, 2019 (now U.S. Pat. No. 10,696,913 issued Jun. 30, 2020), which is a Continuation-in-part Applications of U.S. application Ser. No. 16/445,118 filed Jun. 18, 2019 (now U.S. Pat. No. 10,611,973 issued Apr. 7, 2020), all of which are incorporated herein in their entirety.

FIELD

The present disclosure relates in general to the fields of drying wet biosolids, producing Class A biosolids and producing dried pellets by crushing oversized recycle material.

BACKGROUND

Some gasifiers process wet biosolids. Wet biosolids may be dried using a dryer to produce gasifier feedstock in the form of pellets. The wet biosolids may be blended with a dry seed material before drying the wet biosolids in the dryer. A portion of the dried biosolids may be diverted to be recycled back to the dryer. Each time a particle is recycled like this, the particle may be coated with wet biosolids and the particle diameter increases. After multiple such recycling cycles the particle diameter becomes too large for the wet biosolids processing to continue. For example, the particles may be too large to be separated from a moist air and pellet stream in the dryer and start backing up in the dryer outlet resulting in a shutdown of the dryer.

SUMMARY

FIGS. 17-20 are new and FIGS. 1-16 were previously disclosed. Apparatus and associated methods relate to drying a wet coated seed material stream comprising an incoming wet granular biosolids stream mixed with a controlled size dried seed material recycling stream to produce a moist air and pellet stream, separating an uncontrolled size dried pellet stream from the moist air and pellet stream, diverting a recycle portion of the uncontrolled size dried pellet stream to be recycled, diverting the remainder of the uncontrolled size dried pellet stream to an outlet, resizing oversized pellets from the recycle portion of the uncontrolled size dried pellet stream to produce the controlled size dried seed material recycling stream, and mixing the controlled size dried seed material recycling stream with the incoming wet granular biosolids stream to produce the wet coated seed material stream. Oversized pellets may be selected using a screen. The oversized pellets may be resized using a crusher inline with the recycle stream.

BRIEF DESCRIPTION OF THE DRAWINGS

FIG. 14A shows a perspective view of the interior of the top section of the exemplary universal multi-section clamshell screw feeder pipe implementation depicted by FIG. 12, in an exemplary disassembled mode.

FIG. 14B shows a perspective view of the interior of the bottom section of the exemplary universal multi-section clamshell screw feeder pipe implementation depicted by FIG. 12, in an exemplary disassembled mode.

FIG. 15A shows a side view of three top section segments of the exemplary universal multi-section clamshell screw feeder pipe implementation depicted by FIG. 12, in an exemplary disassembled mode.

FIG. 15B shows a side view of the exemplary universal multi-section clamshell screw feeder pipe implementation depicted by FIG. 12, in an exemplary assembled mode.

FIGS. 18, 19 and 20 show top perspective, top and side views of an exemplary variable speed crusher configured with a screen having apertures sized to retain the oversized pellets in the variable speed rotary crusher until the oversized pellets are crushed to produce reduced size pellets that fall through the screen.

DETAILED DESCRIPTION

Figure 1:
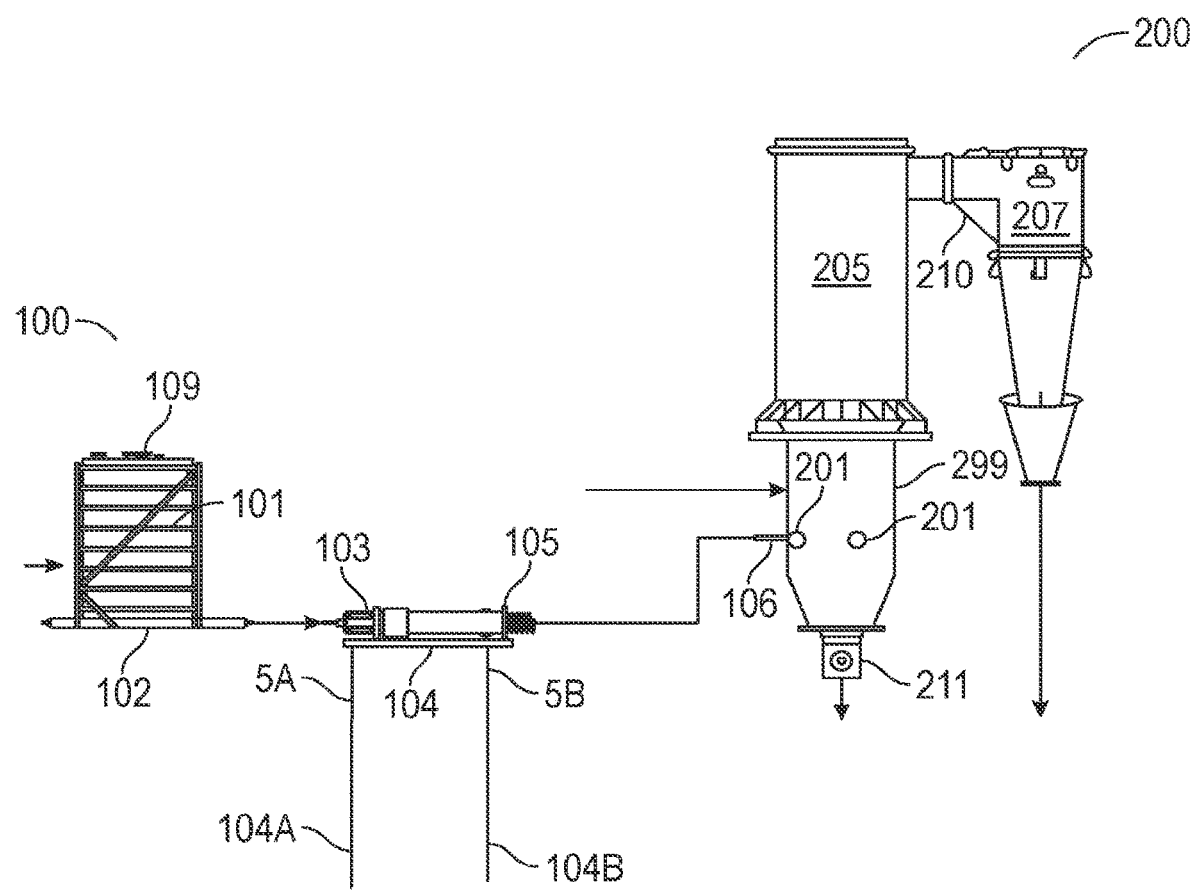
FIG. 1 shows a side view of a gasifier reactor and schematic block diagram illustrating an embodiment of the feeder system configuration for bio-feedstocks.

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Reference will now be made in detail to the various exemplary embodiments of the present invention, which are illustrated in the accompanying drawings.

FIG. 1 shows a side view of a gasifier reactor and a schematic diagram illustrating an embodiment of the feeder system 100 configuration for feedstocks which is generally received in a vertically oriented feed vessel 101 meeting industry standard feedstock supply specifications. The system comprises one or more feed vessels 101 each operably connected to a live bottom dual screw feeder 102. In one embodiment, the feed vessel is rectangular shaped having an upper horizontal side with a feed vessel port 109, an open bottom lower horizontal side, four vertical sides comprising a right side, left side front side and back side; wherein at least one of its four vertical sides is angled at least 60 degrees 110 (shown in FIG. 9) from the horizontal to facilitate proper flow of bio-feedstock materials that have different and/or variable flow properties. In one embodiment, the live bottom dual screw feeder 102 is positioned below and parallel to the lower horizontal side of the feed vessel 101 and extends beyond the right and left vertical sides of the feed vessel 101 as shown in FIGS. 1 and 9-11. The vessel also provides for aeration mechanisms such as provided by aeration ports 107 (shown in FIG. 9) and or removable bridge breakers (not shown) that are inserted on the interior of the feed vessel 101 to assist with continuous flow. The live bottom dual screw feeder 102 is conventional industry equipment selected for their ability to transport multiple kinds of feedstock and as such is not limited to sewage sludge, municipal solid waste, wood waste, refuse derived fuels, automotive shredder residue and non-recyclable plastics including blends of two or more biosolids feed stocks such as wood waste plus biosolids.

Figure 9:
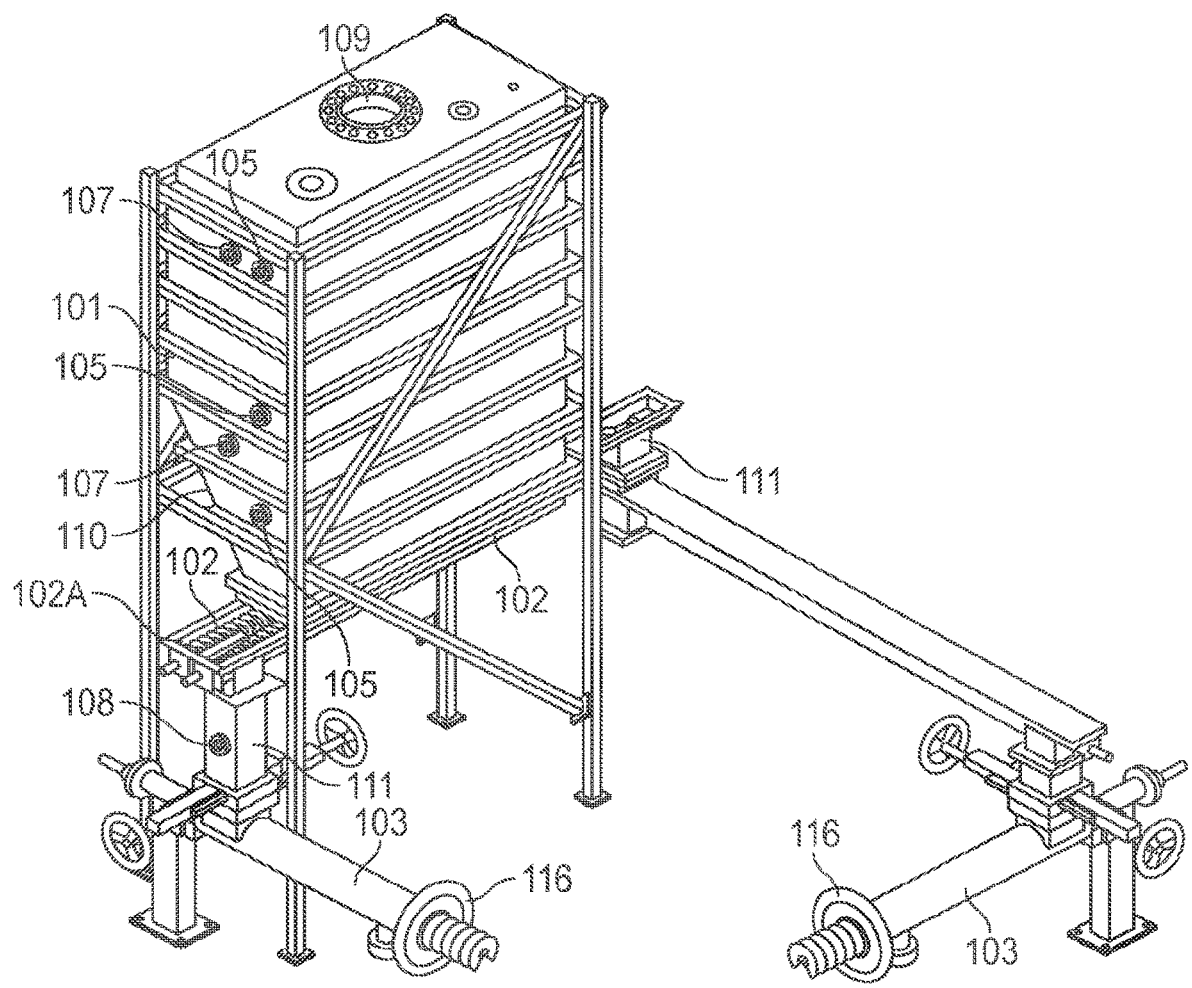
FIG. 9 shows a perspective view of multiple universal gasifier feeder systems connected to a gasifier in accordance with an embodiment of the invention.

Screw feeder 102 also called screw conveyors and are used to control the flow rate of both free and non-free flowing, bulk material from a bin, silo or hopper. Live bottom feeders are specifically designed to convey and meter large quantities of materials in a very efficient manner. During operation the inlet section of the screw trough 102A is designed to be flooded with a selected material. The screw under the inlet can be modified to convey a metered amount of material per revolution of the screw. Modifications include but are not limited to in the flighting diameter, pitch, pipe diameter, trough shape. Screws with uniform diameter and pitch will convey material from the rear of the inlet opening to the front. The drives on screw feeders attached to the rear end, are usually variable speed, so that the discharge from a bin, hopper or feed vessel 101 that falls onto the screw feeder 102 and trough 102A can be adjusted, as required, to stay within a prescribed range. Depending on the number of screws across the bottom of the bin, hopper or feed vessel 101, there may be one drive for all the screws, several drives with the screws driven in-groups or individual drives for each screw. In one embodiment, the dual live bottom screw feeder 102 is configured to convey the material from the feed vessel 101 in two different directions to one of two secondary transfer screw feeders 103 as shown in FIG. 9.

The biosolids are transferred by gravity from the live bottom dual screw feeder 102 through an open bottom chute 111 and onto a secondary transfer screw feeder 103 that conveys the material to a feed nozzle 106 operably connected such as by a flange to flange connection to a fuel feed inlet 201 located on the gasifier reactor vessel 299. In one embodiment, the secondary transfer screw 103 is configured perpendicular to the live bottom dual screw feeder 102 as shown in FIGS. 1 and 9-11. The secondary transfer screw 103 may be equipped with a coolant jacket 104 with a cooling water supply 104A and a cooling water return 104B to maintain a feedstock temperature between 60° F.-200° F. This feature further expands the types of feedstock that can be conveyed into a gasifier reactor. Screw feeders 102 can be substituted with other industry feeders or pressurized pneumatic conveyors. Pressurized pneumatic conveyors would allow the invention to be used in and with a pressurized gasification system and other transfer designs. All screw feeders 102 and transfer screw feeders 103 are variable speed and motor operated. Although it is possible in another embodiment that the screw feed can be manually operated as with a crank.

Figure 10:
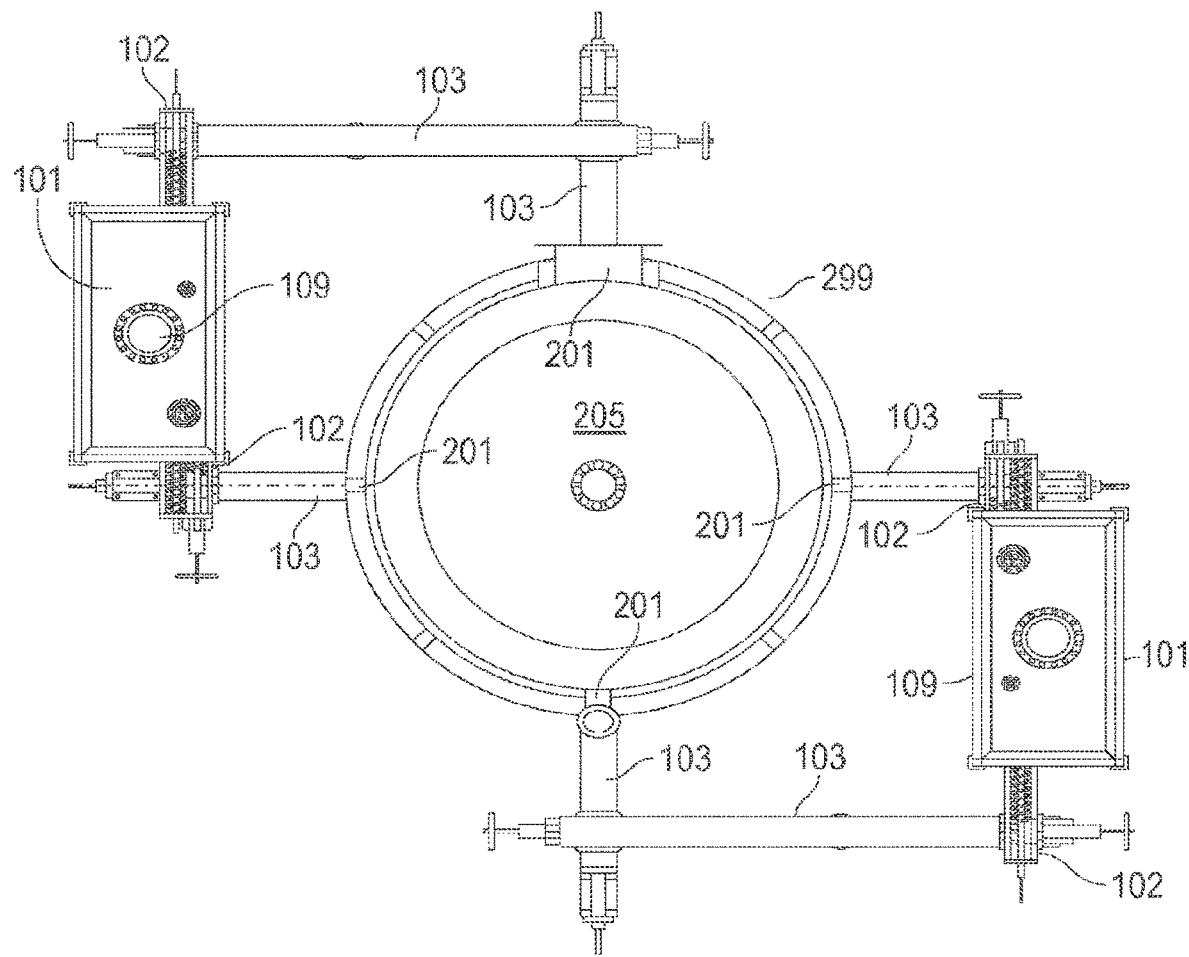
FIG. 10 shows a top view of multiple feeder systems and a single gasifier system with multiple feed points in accordance with an embodiment of the invention.
Figure 11:
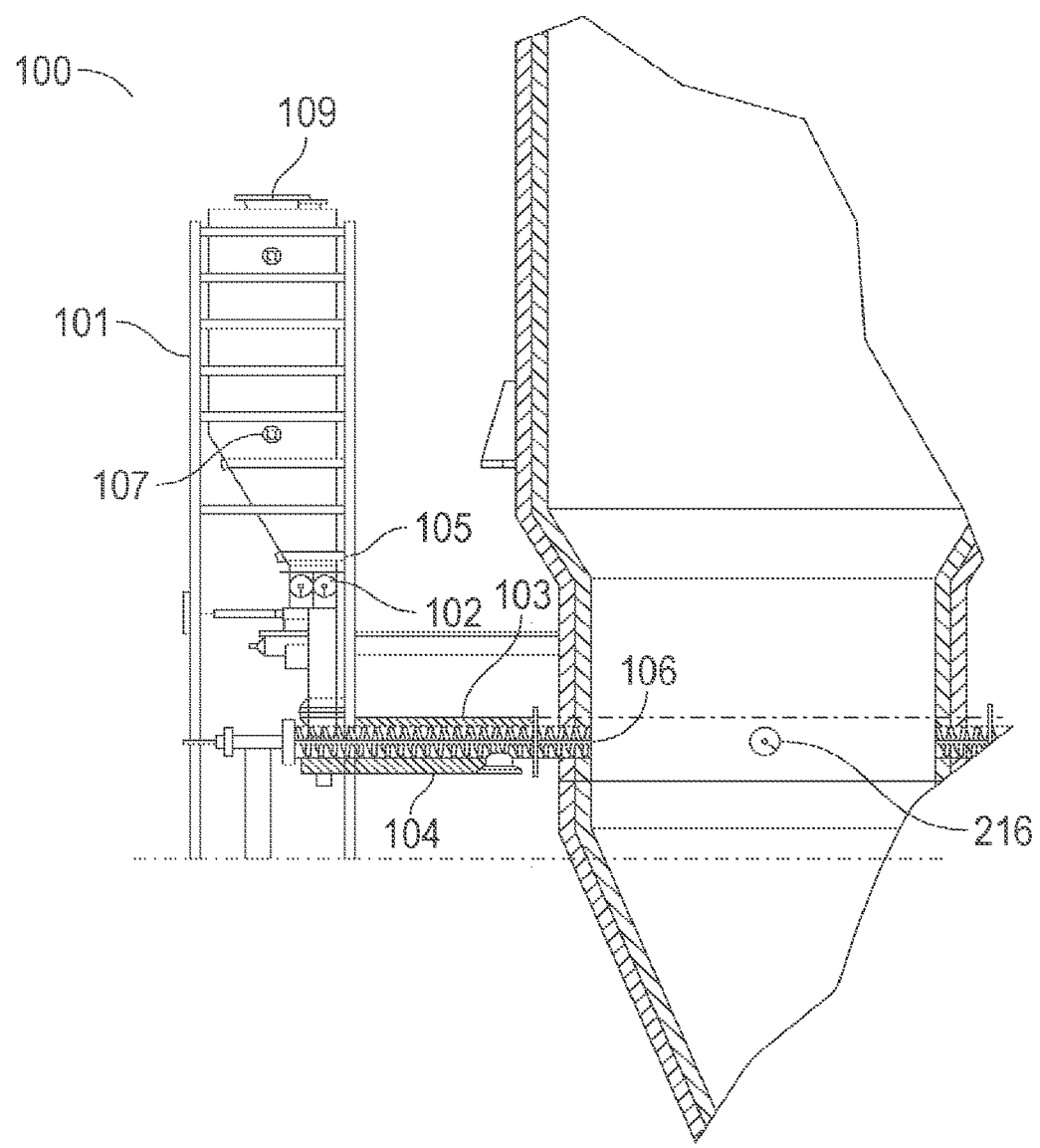
FIG. 11 shows a side view of the universal gasifier feeder system with a cut away view of a gasifier to which the feeder system is attached in accordance with an embodiment of the invention.

In one embodiment, the live bottom dual screw feeder 102 can operate to direct the flow of feedstock in a single direction. In another embodiment, the dual screw feeder 102 can operate to direct flow of feedstock in two different directions. The feedstock can be fed into a gasifier reactor vessel 299 from more than one feed vessel 101 through multiple fuel feed inlets 201 located on the gasifier reactor vessel 299. A live bottom dual screw feeder 102 may therefore feed two separate transfer screw feeders 103; but the transfer screw feeder 103 may also connect and feed another secondary or even tertiary transfer screw feeder 103 as shown in FIGS. 9-11. In one embodiment, the secondary transfer screw 103 is configured perpendicular to the live bottom dual screw feeder 102 and perpendicular to another secondary transfer screw 103 that conveys the material to a feed nozzle 106 operably connected such as by a flange to flange connection to a fuel feed inlet 201 located on the gasifier reactor vessel 299 as shown in FIGS. 9-11. The feed vessel 101 and each screw feeder 102 and 103 connection transfer the biosolids by gravity through an open bottom chute 111 onto the connecting screw feeder until the screw feeder 103 terminates and mechanically connects to the fluidized fuel inlets 201 on the gasifier reactor vessel 299.

The feed vessels 101 may also be sized such that appropriately distributed volumes of feedstock are maintained entering the gasifier through multiple feed ports. The fuel feed inlets 201, also called feed ports, may be placed all around the gasifier vessel reactor 299 to ensure a continuous feed of fuel into the gasifier system 200. The feed vessel 101 inventory may be controlled through load cells or level sensors 105 (shown on FIGS. 9 and 11). Particle size and moisture of the feedstock may be measured upstream of and on route to the feed vessel port 109 to ensure optimum control and performance output of the gasifier system 200.

In one embodiment, the feeder system 100 is capable of receiving and processing multiple feedstocks prepared to a size up to one inch with an optimal range between 1/16 and 1/4 inches. A key requirement of this embodiment is prepping the feedstock to a uniform size, moisture content and quality which is achieved through conventional processes. Prepared feedstock is then introduced into the vessel feed port 109 of the universal feeder vessel 101 and ultimately the gasification reactor vessel 299 for gasification.

Figure 2:
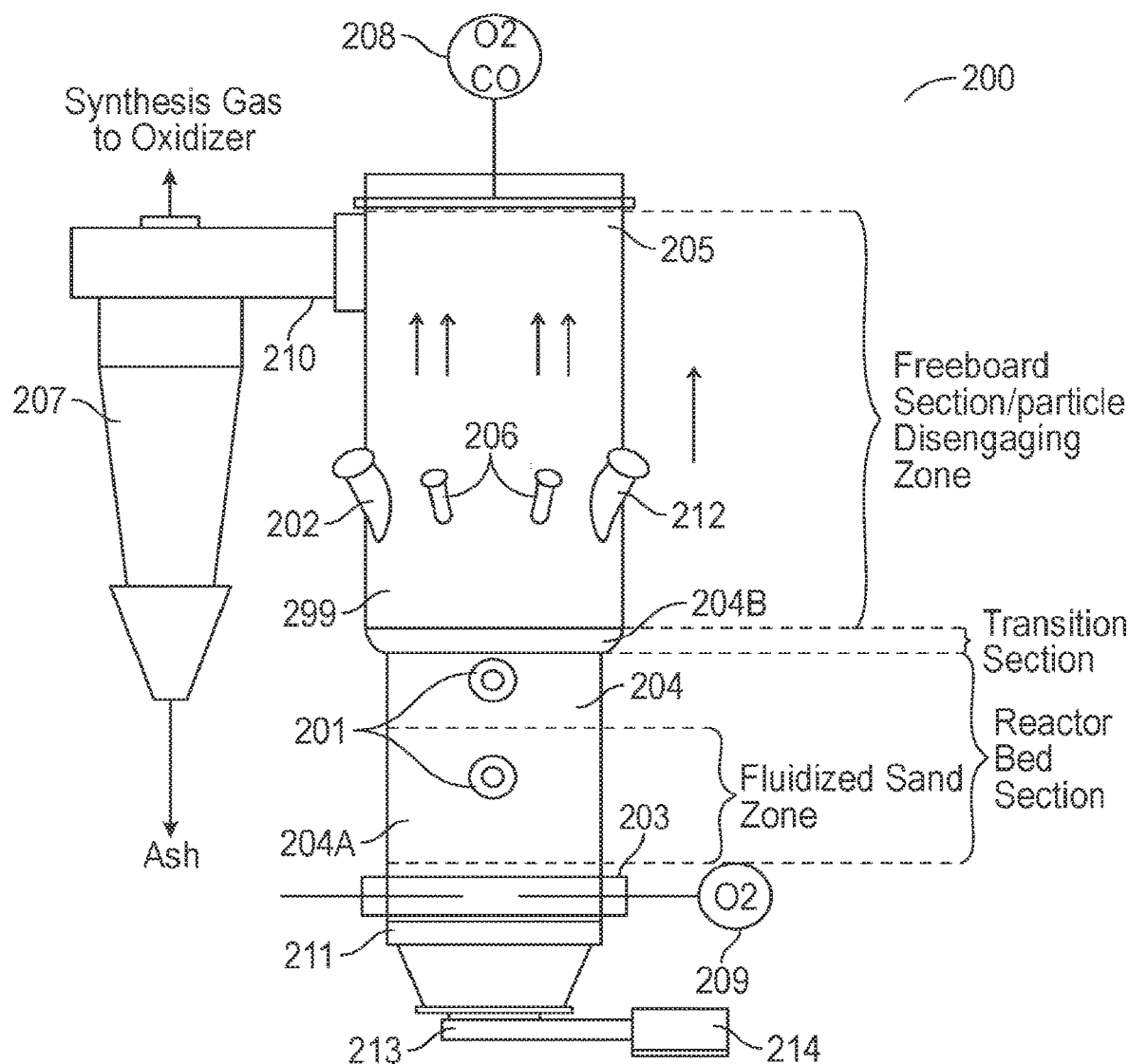
FIG. 2 shows a schematic side view illustrating a fluidized bed gasifier in accordance with an embodiment of the invention.

FIG. 2 shows an embodiment of a bubbling type fluidized bed gasifier 200. In one embodiment, the invention is mechanically connected to a standardized feeder system 100 (shown in FIG. 1) which is designed for a gasifier 200 that enables different feedstock material to be fed into existing gasification reactor vessel 299 without having to custom design a feed system for or integrate a custom feeder system into the gasifier system 200. In one embodiment, the bubbling fluidized bed gasifier 200 will include a reactor 299 operably connected to the feeder system 100 as integral part of a standard gasifier system 200.

In continued reference to FIG. 2, the bubbling fluidized bed gasifier 200 will include a reactor 299 operably connected to a feeder system 100 (shown in FIG. 1) as an extended part of a standard gasifier system 200. In one embodiment, the gasifier 200 includes a reactor vessel 299 having a fluidized media bed 204A, such as but not limited to quartz sand, that is in the base of the reactor vessel and called the reactor bed section 204. In one embodiment, the fluidized sand is a zone that has a temperature of 1150-1600° F. Located above the reactor bed section 204 is a transition section 204B and above the transition section 204B is the freeboard section 205 of the reactor vessel 299. Fluidizing gas consisting of air, flue gas, pure oxygen or steam, or a combination thereof, is introduced into the fluidized bed reactor 299 to create a velocity range inside the freeboard section 205 of the gasifier 200 that is in the range of 0.1 m/s (0.33 ft/s) to 3 m/s (9.84 ft/s). The biosolids are heated inside the fluidized bed reactor to a temperature range between 900° F. and 1700° F. in an oxygen-starved environment having sub-stoichiometric levels of oxygen, e.g., typically oxygen levels of less than 45% of stoichiometric.

Figure 3:
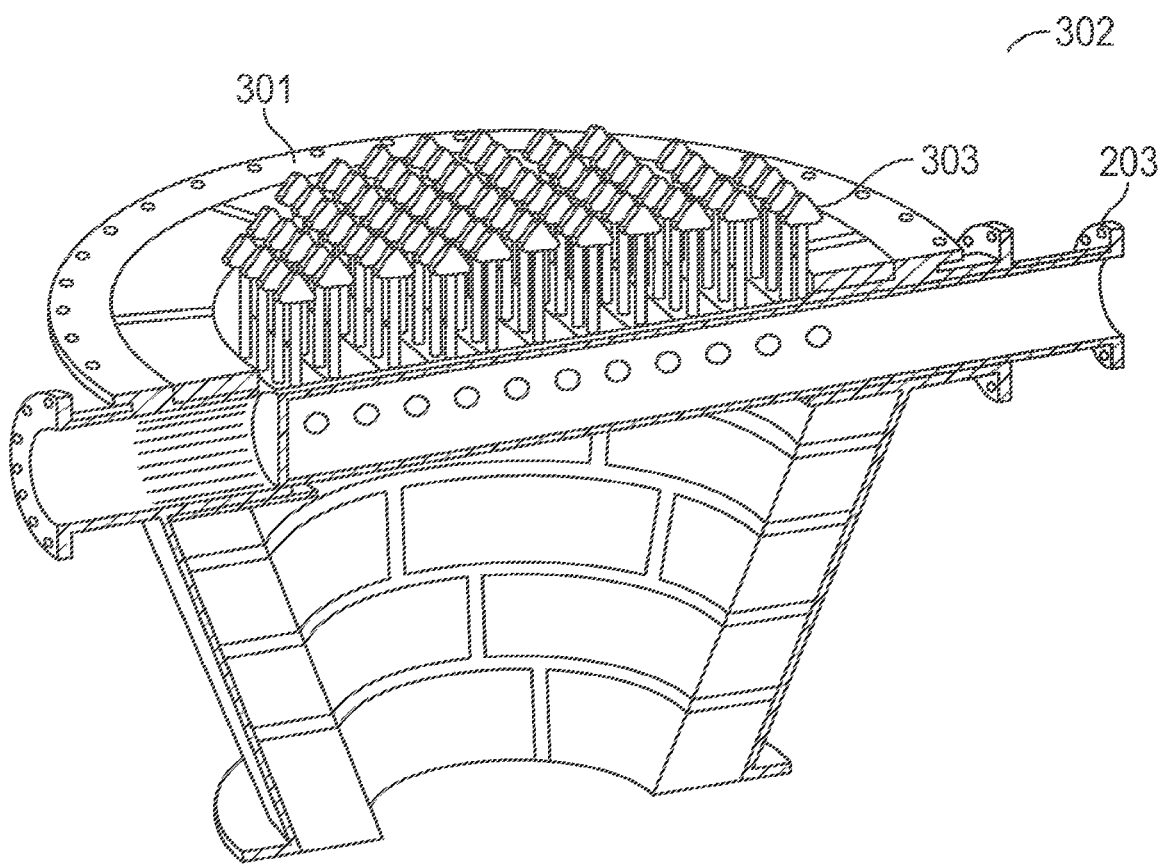
FIG. 3 shows a perspective view illustrating a tuyere type gas distributor of the gasifier in accordance with an embodiment of the invention.
Figure 8A:
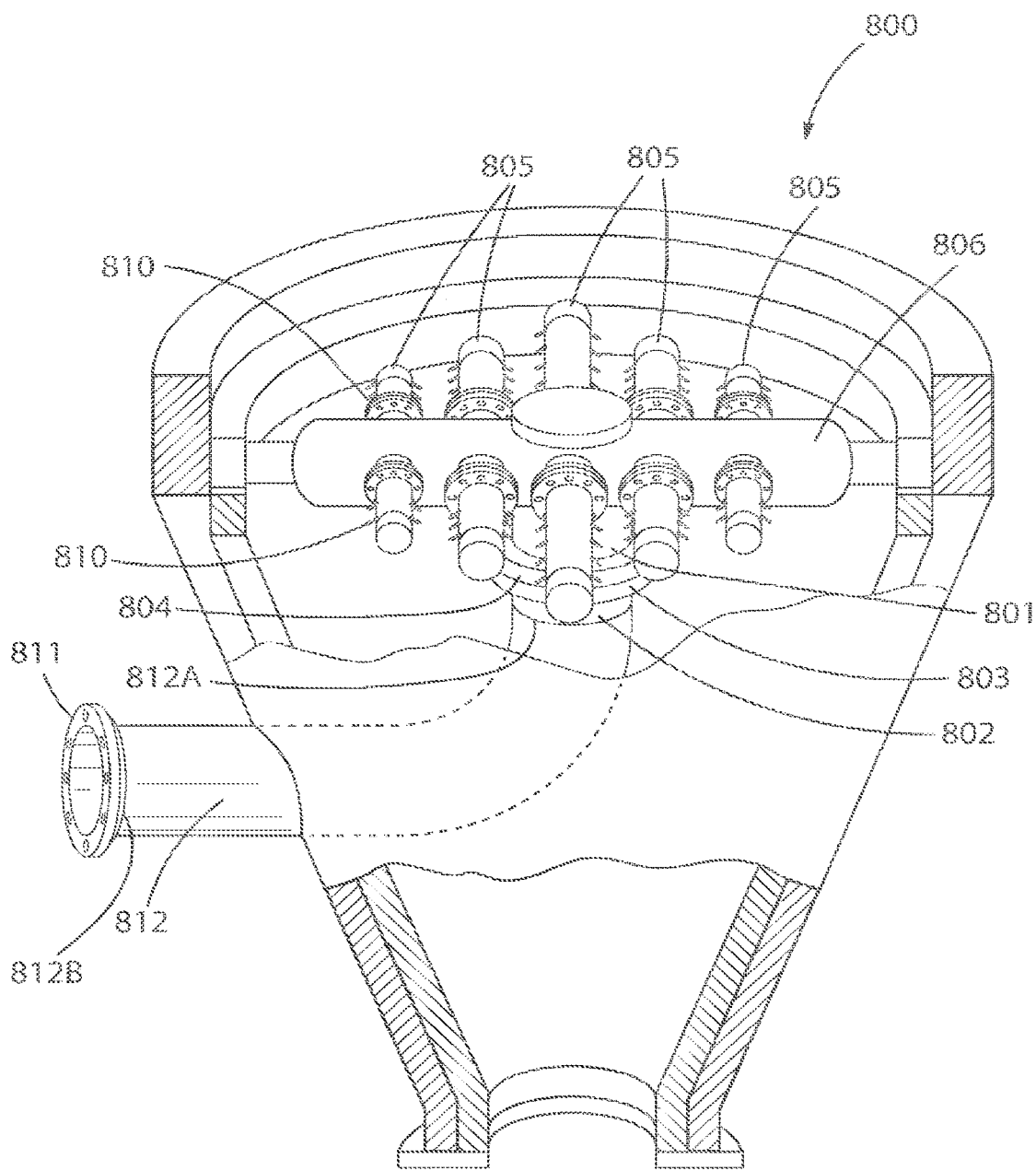
FIG. 8A shows a cut away perspective view illustrating a pipe gas distributor of the gasifier in accordance with an embodiment of the invention.
Figure 8B:
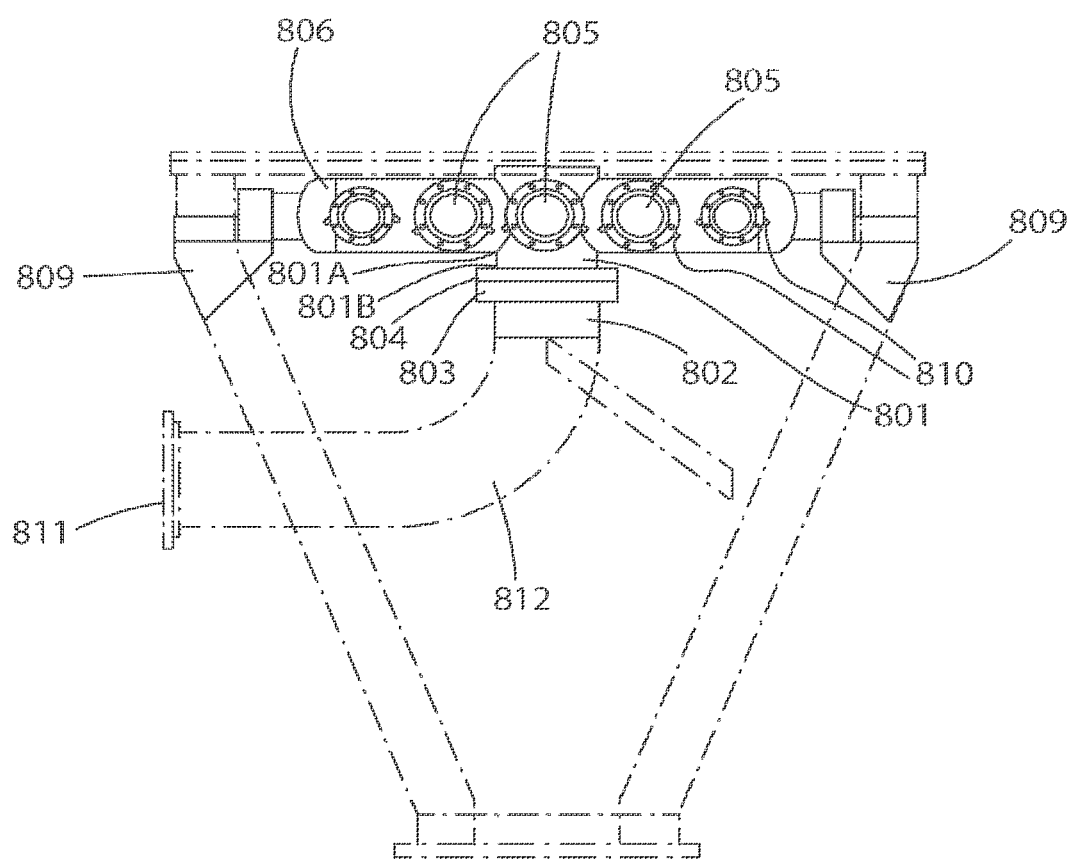
FIG. 8B shows a side elevational view illustrating a pipe gas distributor of the gasifier in accordance with an embodiment of the invention.

The reactor fluidized bed section 204 of a fluidized bubbling bed gasifier 200 is filled with a fluidizing media 204A that may be a sand (e.g., quartz or olivine), or any other suitable fluidizing media known in the industry. Feedstock such as, but not limited to dried biosolids, is supplied to the reactor bed section 204 through fuel feed inlets 201 at 40-250° F. In one embodiment, the feedstock is supplied to the reactor bed section 204 through fuel feed inlets 201 at 215° F.; with the gas inlet 203 in the bubbling bed receiving an oxidant-based fluidization gas such as but not limited to e.g., air. In one embodiment, the air could be enriched air, or a mix of air and recycled flue gas, etc. The air is not pre-heated, it is fed at ambient conditions. The bed is heated up with natural gas and air combustion from a start-up burner and when the bed reaches its ignition temperature for gasification the reactions takes off and is self-sustaining so long as feed carbon and oxygen continue to react. The fluidization gas is fed to the bubbling bed via a gas distributor, such as shown in FIGS. 3 and 8A-B. An oxygen-monitor 209 may be provided in communication with the fluidization gas inlet 203 to monitor oxygen concentration in connection with controlling oxygen levels in the gasification process. An inclined or over-fire natural gas burner (not visible) located on the side of the reactor vessel 299 receives a natural gas and air mixture via a port 202. In one embodiment, the natural gas air mixture is 77° F. which can be used to start up the gasifier and heat the fluidized bed media 204A. When the minimum ignition temperature for self-sustaining of the gasification reactions is reached (~900° F.), the natural gas is shut off. View ports 206 and a media fill port 212 are also provided.

In one embodiment, a freeboard section 205 is provided between the fluidized bed section 204 and the producer gas outlet 210 of the gasifier reactor vessel 299. As the biosolids thermally decompose and transform in the fluidized bed media section (or sand zone) into producer gas and then rise through the reactor vessel 299, the fluidizing medium 204A in the fluidized bed section 204 is disentrained from the producer gas in the freeboard section 205 which is also known as and called a particle disengaging zone. A cyclone separator 207 may be provided to separate material exhausted from the fluidized bed reactor 299 resulting in clean producer gas for recovery with ash exiting the bottom of the cyclone separator 207 alternatively for use or disposal.

An ash grate 211 may be fitted below the gasifier vessel for bottom ash removal. The ash grate 211 may be used as a sifting device to remove any large inert, agglomerated or heavy particles so that the fluidizing media and unreacted char can be reintroduced into the gasifier for continued utilization. In one embodiment, a valve such as but not limited to slide valve 213 which is operated by a mechanism to open the slide valve 214 is located beneath the ash grate 211 to collect the ash. In one embodiment, a second valve 213 and operating mechanism 214 (no shown) are also located below the cyclone separator 207 for the same purpose. That is as a sifting device to remove any large inert, agglomerated or heavy particles so that the fluidizing media and unreacted char can be reintroduced into the gasifier for continued utilization. In one embodiment, the ash grate 211 may be a generic solids removal device known to those of ordinary skill in the art. In another embodiment, the ash grate 211 may be replaced by or combined with the use of an overflow nozzle.

A producer gas control 208 monitors oxygen and carbon monoxide levels in the producer gas and controls the process accordingly. In one embodiment a gasifier feed system 100 feeds the gasifier reactor 299 through the fluidized fuel inlets 201. In one embodiment, the gasifier unit 200 is of the bubbling fluidized bed type with a custom fluidizing gas delivery system and multiple instrument control. The gasifier reactor 299 provides the ability to continuously operate, discharge ash and recycle flue gas for optimum operation. The gasifier reactor 299 can be designed to provide optimum control of feed rate, temperature, reaction rate and conversion of varying feedstock into producer gas.

A number of thermocouple probes (not shown) are placed in the gasifier reactor 299 to monitor the temperature profile throughout the gasifier. Some of the thermal probes are placed in the fluidized bed section 204 of the gasifier rector 299, while others are placed in the freeboard section 205 of the gasifier. The thermal probes placed in the fluidized bed section 204 are used not only to monitor the bed temperature but are also control points that are coupled to the gasifier air system via port 202 in order to maintain a certain temperature profile in the bed of fluidizing media. There are also a number of additional control instruments and sensors that may be placed in the gasifier system 200 to monitor the pressure differential across the bed section 204 and the operating pressure of the gasifier in the freeboard section 205. These additional instruments are used to monitor the conditions within the gasifier as well to as control other ancillary equipment and processes to maintain the desired operating conditions within the gasifier. Examples of such ancillary equipment and processes include but are not limited to the cyclone, thermal oxidizer and recirculating flue gas system and air delivery systems. These control instruments and sensors are well known in the industry and therefore not illustrated.

FIG. 3 shows a perspective cut away side view illustrating a gas distributor 302 of the gasifier in accordance with an embodiment of the invention. A flue gas and air inlet 203 feeds flue gas and air to an array of nozzles 301. Each of the nozzles includes downwardly directed ports inside cap 303 such that gas exiting the nozzle is initially directed downward before being forced upward into the fluidized bed in the reactor bed section 204 (shown in FIG. 2). An optional ash grate 211 under the gasifier may be used as a sifting device to remove any agglomerated particles so that the fluidizing media and unreacted char can be reintroduced into the gasifier for continued utilization. Also shown is a cut away view of the gas inlet 203 in the bubbling bed receiving an oxidant-based fluidization gas such as but not limited to e.g., air.

Biogasifier Reactor Sizing

The following provides a non-limiting example illustrating computation of the best dimensions for a bubbling fluidized bed gasification reactor in accordance with an embodiment of the invention. The gasifier, in this example, is sized to accommodate two specific operating conditions: The current maximum dried biosolids output generated from the dryer with respect to the average solids content of the dewatered sludge supplied to the dryer from the existing dewatering unit; and the future maximum dried biosolids feed rate that the dryer will have to deliver to the gasifier if the overall biosolids processing system has to operate without consumption of external energy, e.g., natural gas, during steady state operation with 25% solids content dewatered sludge being dried and 5400 lb/hr of water being evaporated from the sludge.

The first operating condition corresponds to the maximum output of dried sewage sludge from the dryer if, e.g., 16% solids content sludge is entering the dryer, and 5400 lb/hr of water is evaporating off the sludge. This corresponds to a biosolids feed rate in the small-scale gasifier of 1,168 lbs/hr of thermally dried biosolids at 10% moisture content entering the gasifier. In one embodiment, a solids content of 16-18% represents the estimated extent of dewatering that is required to make the drying load equal to the amount of thermal energy which can be recovered from the flue gas and used to operate the dryer. If sludge below 16% solids content are processed in the dryer, an external heat source can supplement the drying process. The second operating condition corresponds to the maximum amount of dried biosolids (dried to 10% moisture content) that the drier can produce if 25% solids content dewatered biosolids is fed into the drier. The second condition corresponds to the gasifier needing to process 2,000 lb/hr of 10% moisture content biosolids. In other words, there will be excess heat from feeding biosolids to the gasifier if greater than 20% content of biosolids in the sludge is used.

Figure 4:
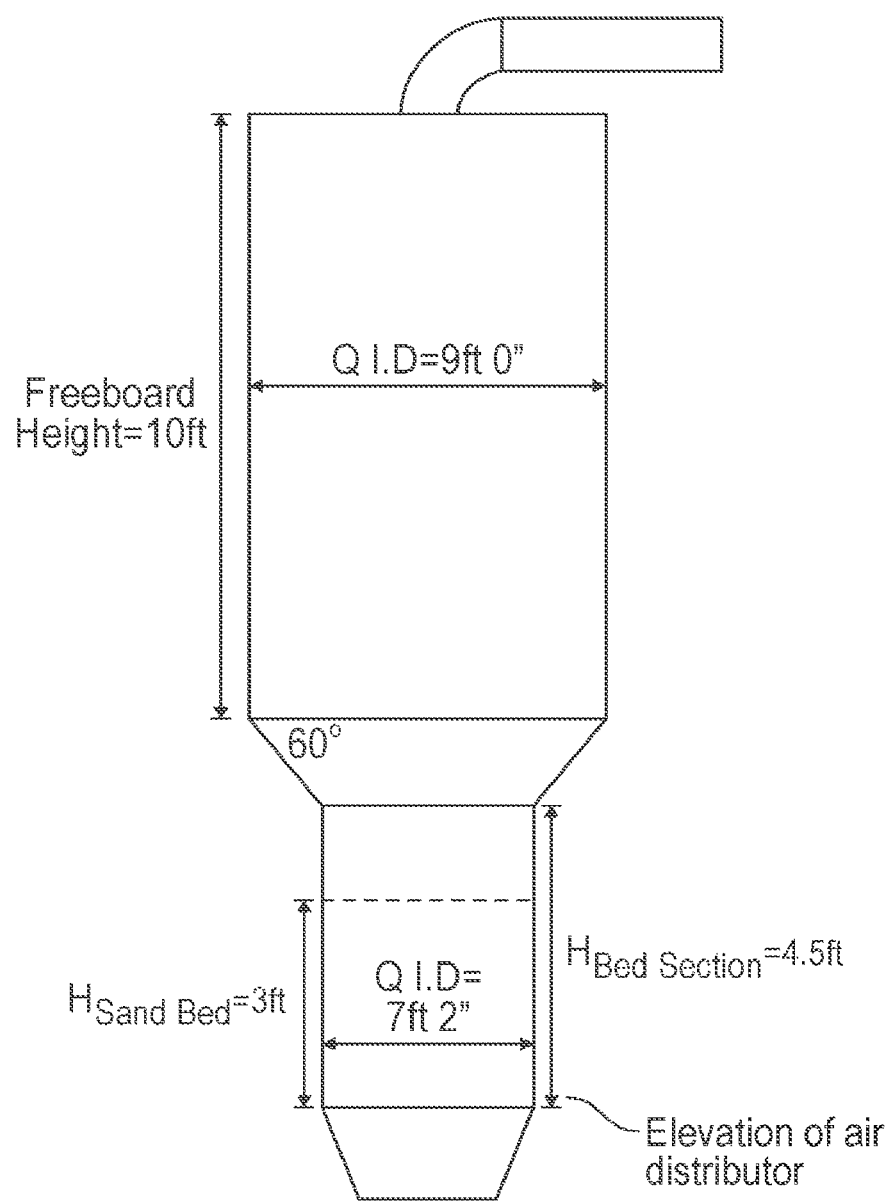
FIG. 4 shows a schematic side view illustrating a mid-size non-limiting example of a gasifier's internal dimensions in accordance with an embodiment of the invention.

FIG. 4 shows a non-limiting example of the gasifier with a reactor freeboard diameter of 9 feet, 0 inches and other internal dimensions in accordance with the invention. The dimensions shown satisfy the operational conditions that are outlined in previous applications. As is known in the art, one factor in determining gasifier sizing is the bed section internal diameter. The role of the bed section of the reactor is to contain the fluidized media bed. The driving factor for selecting the internal diameter of the bed section of the gasifier is the superficial velocity range of gases, which varies with different reactor internal diameters. The internal diameter has to be small enough to ensure that the media bed is able to be fluidized adequately for the given air, recirculated flue gas and fuel feed rates at different operating temperatures, but not so small as to create such high velocities that a slugging regime occurs and media is projected up the freeboard section. The media particle size can be adjusted during commissioning to fine tune the fluidizing behavior of the bed. In the present, non-limiting example, an average media (sand) particle size of about 700 μm was selected due to its ability to be fluidized readily, but also its difficulty to entrain out of the reactor. The most difficult time to fluidize the bed is on start up when the bed media and incoming gases are cold. This minimum flow rate requirement is represented by the minimum fluidization velocity, ("$U_{mf}$") values displayed in the previous table.

Another factor in determining gasifier sizing is the freeboard section internal diameter. The freeboard region of the gasifier allows for particles to drop out under the force of gravity. The diameter of the freeboard is selected with respect to the superficial velocity of the gas mixture that is created from different operating temperatures and fuel feed rates. The gas superficial velocity must be great enough to entrain the small ash particles, but not so great that the media particles are entrained in the gas stream. The extent of fresh fuel entrainment should also be minimized from correct freeboard section sizing. This is a phenomenon to carefully consider in the case of biosolids gasification where the fuel typically has a very fine particle size. Introducing the fuel into the side of the fluidized bed below the fluidizing media's surface is one method to minimize fresh fuel entrainment. This is based on the principle that the fuel has to migrate up to the bed's surface before it can be entrained out of the gasifier, and this provides time for the gasification reactions to occur.

Figure 5:
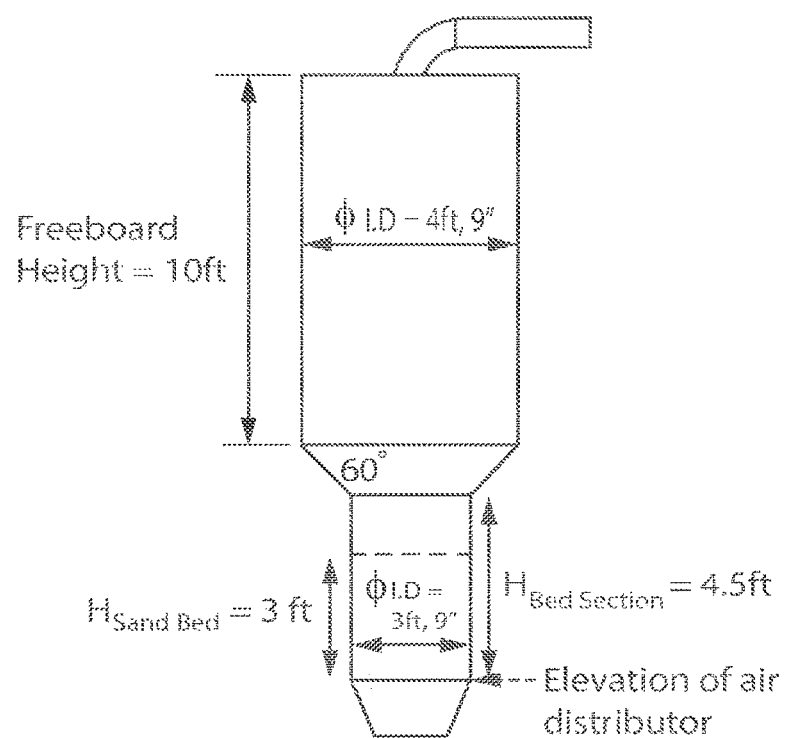
FIG. 5 shows a schematic side view illustrating a smaller non-limiting example of a gasifier's internal dimensions in accordance with an embodiment of the invention.

In one non-limiting example shown in FIG. 5, a reactor with freeboard diameter of 4 feet, 9 inches is chosen for smaller volumes of feed of about 24 tons per day but also to maintain gas superficial velocities high enough to entrain out ash but prevent entrainment of sand (or other fluidizing media) particles in the bed.

A further factor in determining gasifier sizing is the media bed depth and bed section height. In general, the higher the ratio of media to fuel in the bed, the more isothermic the bed temperatures are likely to be. Typically, fluidized beds have a fuel-to-media mass ratio of about 1-3%. The amount of electrical energy consumed to fluidize the media bed typically imparts a practical limit on the desirable depth of the media. Deeper beds have a higher gas pressure drop across them and more energy is consumed by the blower to overcome this resistance to gas flow. A fluidizing media depth of 3 feet is chosen in this example shown in FIG. 5, which is based on balancing the blower energy consumption against having enough media in the bed to maintain isothermal temperature and good heat transfer rates. The height of the bed section of the reactor in this non-limiting example is based on a common length-to-diameter aspect ratio of 1.5, relative to the depth of the fluidizing media.

Another factor in determining gasifier sizing is the height of the freeboard section 205. The freeboard section 205 is designed to drop out particles and return it to the bed, under the force of gravity and a reduction of superficial velocity as a result of the larger diameter in the free board section. As one moves up in elevation from the bed's surface, the particle size and density decreases, until at a certain elevation, a level known as the Transport Disengaging Height (TDH) is reached. Above the TDH, the particle density entrained up the reactor is constant. Extending the reactor above the TDH adds no further benefit to particle removal. For practical purposes 10 feet is selected for the height of the freeboard section 205 in this non-limiting example shown in FIG. 5. While the invention has been particularly shown and described with reference to a preferred embodiment in FIG. 5, it will be understood by those skilled in the art that various changes in form and details may be made therein without departing from the spirit and scope of the invention.

Figure 6:
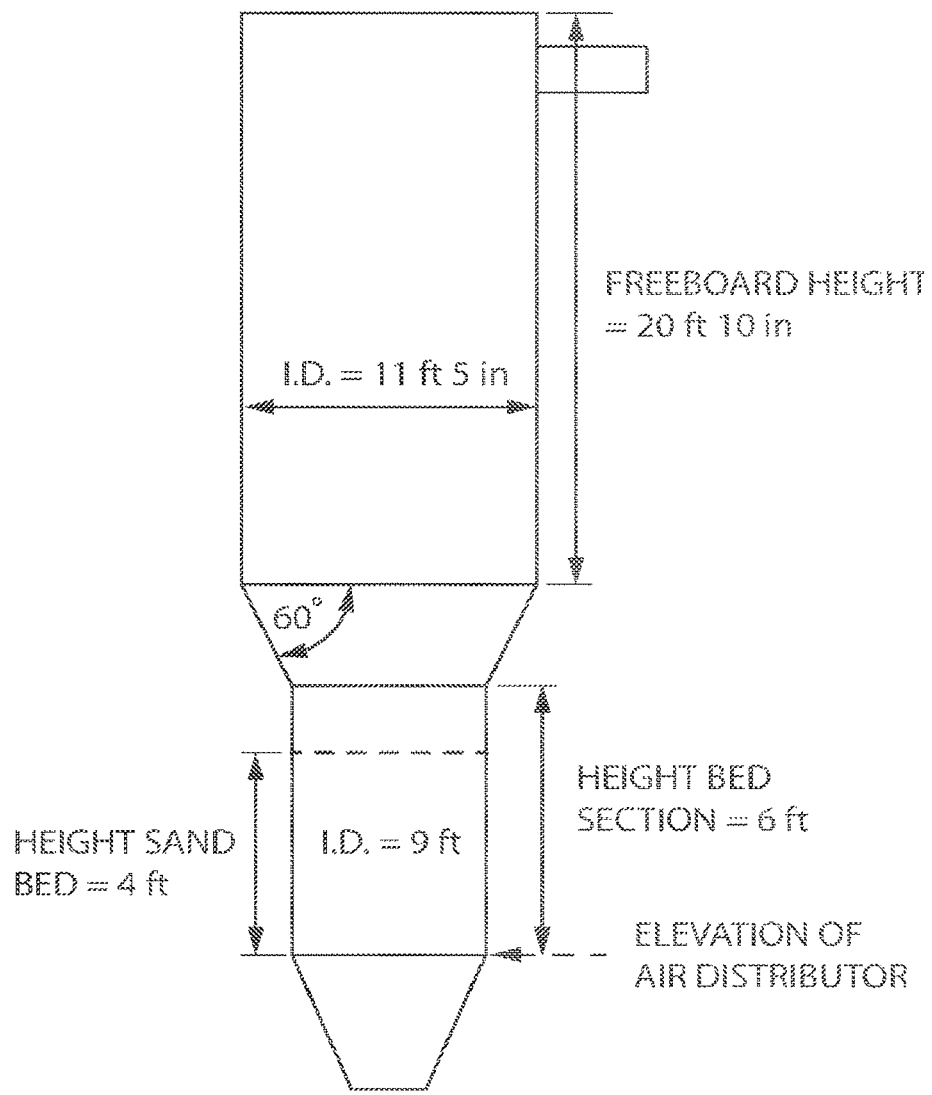
FIG. 6 shows a schematic side view illustrating a larger non-limiting example of a gasifier's internal dimensions in accordance with an embodiment of the invention.

FIG. 6 shows a schematic side view illustrating a larger scaled-up embodiment is provided in which the gasifier internal dimensions are enlarged in accordance with the invention. In this embodiment, the invention illustrates a scaling up or enlargement of the gasifier reactor vessel. In one embodiment, the increase in reactor vessel size has a capacity scale that is at least 4 times larger in processing feedstock volume than the small-scale reactor vessel shown in FIG. 5. For example, the small-scale reactor can process 24 tons per day of feedstock. The large-scale reactor can process more than 40 tons per day with an average of about 100 tons per day of feedstock. At an average of 100 tons per day of feedstock equals an average of at least 4 times that of the small-scale reactor of 24 tons per day which is equal to about 96 tons per day. In one, embodiment, of the scaled-up large format reactor, the multi-tuyere gas distributor shown in FIG. 3 is replaced with a conventional pipe-based fluidization gas distribution system shown in FIGS. 8A-8B. The substitution of the pipe-based distributor 800 simplifies and eliminates the complexity, time and cost associated with the mechanical fabrication of scaling up the multi-tuyere gas distributor design used in the bioreactor unit illustrated in FIG. 3. A conventional pipe-based fluidization gas distribution system allows a single large vessel reactor capable of processing at least 4 times the quantity of feedstock processed in a small-scale reactor. The larger scale reactor illustrated in FIGS. 6-7 has many of the same features as the smaller scaled version illustrated in FIGS. 2 and 5. However, some adjustments to the reactor bed and free-board height are required based on the change in diameter of the reactor bed section. The formula for Transport Disengaging Height ("TDH") is a function of the change in diameter of the reactor bed section 704 shown in FIG. 7. Specifically, the geometric ratios remain the same to minimize/eliminate performance scale-up risk.

FIG. 6 also shows a non-limiting example illustrating computation of the sample dimensions for sizing the gasifier reactor when it is a bubbling fluidized bed gasification reactor. More specifically, FIG. 6 shows a non-limiting example of the gasifier with a reactor freeboard diameter of 11 feet, 5 inches and other internal dimensions in accordance with the invention. The gasifier, in this example, is sized to accommodate specific design operating conditions for dried biosolids feed rate delivered to the gasifier corresponding to a biosolids feed rate in the large-scale gasifier of 8,333 lb/hr and 7040 lb/hr of thermally dried biosolids at 10% moisture content entering the gasifier.

Figure 7:
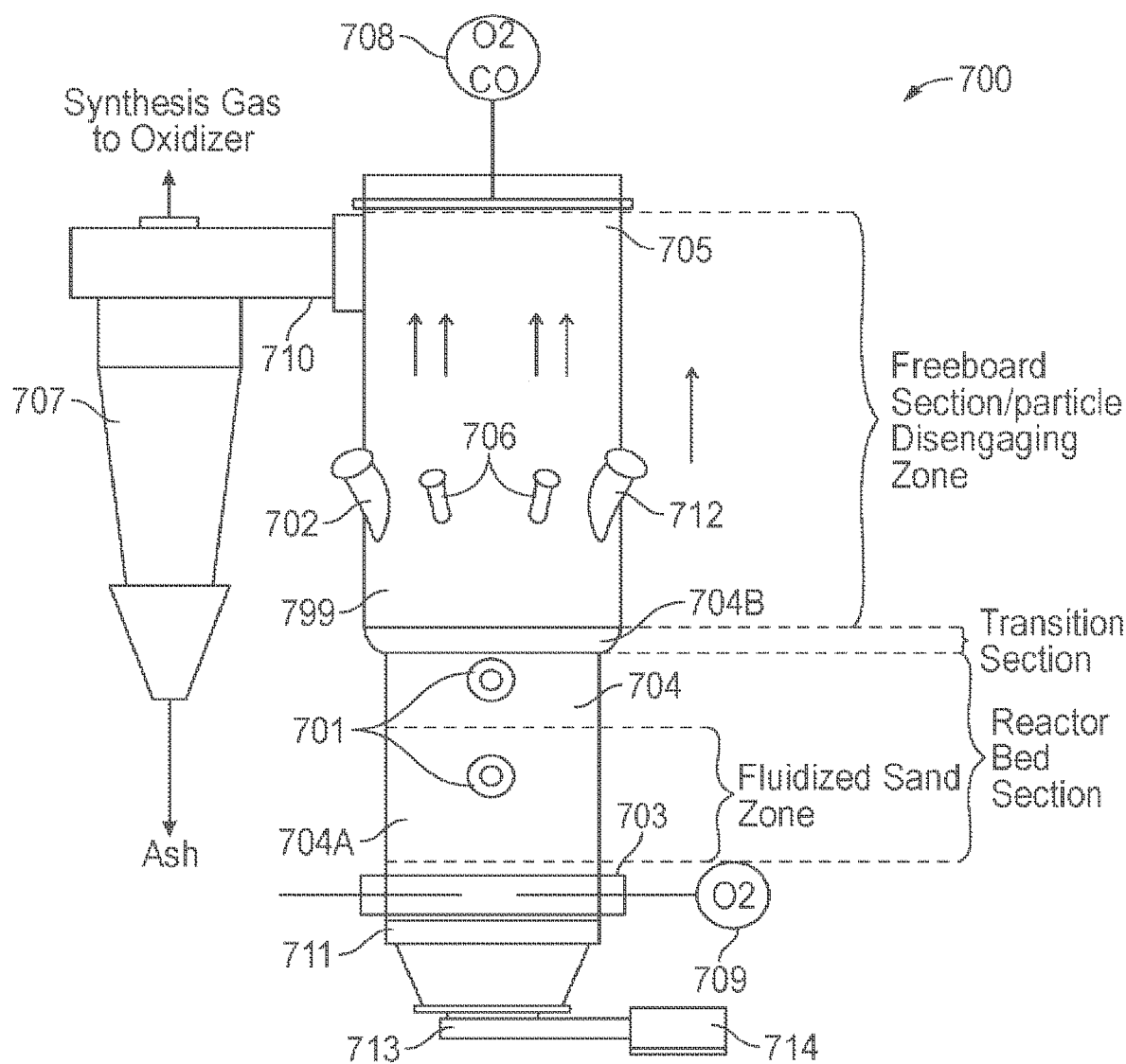
FIG. 7 shows a schematic side view illustrating the larger scaled up fluidized bed gasifier of FIG. 6 in accordance with an embodiment of the invention.

FIG. 7 shows a scaled-up embodiment of a bubbling type fluidized bed gasifier 700. In one embodiment, the bubbling fluidized bed gasifier 700 will include a reactor 799 operably connected to the feeder system (shown in FIG. 1) as an extended part of the standard gasifier system 700. A fluidized media bed 704A such as but not limited to quartz sand is in the base of the reactor vessel called the reactor bed section 704. In one embodiment, the fluidized sand is a zone that has a temperature of 1150° F.-1600° F. Located above the reactor bed section 704 is a transition section 704B and above the transition section 704B is the freeboard section 705 of the reactor vessel 799. Fluidizing gas consisting of air, flue gas, pure oxygen or steam, or a combination thereof, is introduced into the fluidized bed reactor 799 to create a velocity range inside the freeboard section 705 of the gasifier 700 that is in the range of 0.1 m/s (0.33 ft/s) to 3 m/s (9.84 ft/s). The biosolids are heated inside the fluidized bed reactor to a temperature range between 900° F. and 1600° F. in an oxygen-starved environment having sub-stoichiometric levels of oxygen, e.g., typically oxygen levels of less than 45% of stoichiometric. In another embodiment, the fluidized sand is a zone that has a temperature of 1150° F.-1600° F.

The reactor fluidized bed section 704 of a fluidized bubbling bed gasifier 700 is filled with a fluidizing media 704A that may be a sand (e.g., quartz or olivine), or any other suitable fluidizing media known in the industry. Feedstock such, as but not limited to sludge, is supplied to the reactor bed section 704 through fuel feed inlets 701 at 40-250° F. In one embodiment, the feedstock is supplied to the reactor bed section 704 through fuel feed inlets 701 at 215° F.; with the gas inlet 703 in the bubbling bed receiving an oxidant-based fluidization gas such as but not limited to e.g., gas, flue gas, recycled flue gas, air, enriched air and any combination thereof (hereafter referred to generically as "gas" or "air"). In one embodiment, the air is at about 600° F. The type and temperature of the air is determined by the gasification fluidization and temperature control requirements for a particular feedstock. The fluidization gas is fed to the bubbling bed via a gas distributor, such as shown in FIGS. 3 and 8A-B. An oxygen-monitor 709 may be provided in communication with the fluidization gas inlet 703 to monitor oxygen concentration in connection with controlling oxygen levels in the gasification process. An inclined or over-fire natural gas burner (not visible) located on the side of the reactor vessel 799 receives a natural gas and air mixture via a port 702. In one embodiment, the natural gas air mixture is 77° F. which can be sued to start up the gasifier and heat the fluidized bed media 704A. When the minimum ignition temperature for self-sustaining of the gasification reactions is reached (~900° F.), the natural gas is shut off. View ports 706 and a media fill port 712 are also provided.

In one embodiment, a freeboard section 705 is provided between the fluidized bed section 704 and the producer gas outlet 710 of the gasifier reactor vessel 799. As the biosolids thermally decompose and transform in the fluidized bed media section (or sand zone) into producer gas and then rise through the reactor vessel 799, the fluidizing medium 704A in the fluidized bed section 704 is disentrained from the producer gas in the freeboard section 705 which is also known as and called a particle disengaging zone. A cyclone separator 707 may be provided to separate material exhausted from the fluidized bed reactor 799 resulting in clean producer gas for recovery with ash exiting the bottom of the cyclone separator 707 alternatively for use or disposal.

An ash grate 711 may be fitted below the gasifier vessel for bottom ash removal. The ash grate 711 may be used as a sifting device to remove any large inert, agglomerated or heavy particles so that the fluidizing media and unreacted char can be reintroduced into the gasifier for continued utilization. In one embodiment, a valve such as but not limited to slide valve 713 which is operated by a mechanism to open the slide valve 714 is located beneath the ash grate 711 to collect the ash. In one embodiment, a second valve 713 and operating mechanism 714 (no shown) are also located below the cyclone separator 207 for the same purpose. That is as a sifting device to remove any large inert, agglomerated or heavy particles so that the fluidizing media and unreacted char can be reintroduced into the gasifier for continued utilization. In one embodiment the ash grate 711 may be a generic solids removal device known to those of ordinary skill in the art. In another embodiment, the ash grate 711 may be replaced by or combined with the use of an overflow nozzle.

A producer gas control 708 monitors oxygen and carbon monoxide levels in the producer gas and controls the process accordingly. In one embodiment, a gasifier feed system (shown in FIGS. 1 and 9-11) feeds the gasifier reactor 799 through the fluidized fuel inlets 701. In one embodiment, the gasifier unit 700 is of the bubbling fluidized bed type with a custom fluidizing gas delivery system and multiple instrument control. The gasifier reactor 799 provides the ability to continuously operate, discharge ash and recycle flue gas for optimum operation. The gasifier reactor 799 can be designed to provide optimum control of feed rate, temperature, reaction rate and conversion of varying feedstock into producer gas.

A number of thermocouple probes (not shown) are placed in the gasifier reactor 799 to monitor the temperature profile throughout the gasifier. Some of the thermal probes are placed in the fluidized bed section 704 of the gasifier rector 799, while others are placed in the freeboard section 705 of the gasifier. The thermal probes placed in the fluidized bed section 704 are used not only to monitor the bed temperature but are also control points that are coupled to the gasifier air system via port 702 in order to maintain a certain temperature profile in the bed of fluidizing media. There are also a number of additional control instruments and sensors that may be placed in the gasifier system 700 to monitor the pressure differential across the bed section 704 and the operating pressure of the gasifier in the freeboard section 205. These additional instruments are used to monitor the conditions within the gasifier as well to as control other ancillary equipment and processes to maintain the desired operating conditions within the gasifier. Examples of such ancillary equipment and processes include but are not limited to the cyclone, thermal oxidizer and recirculating flue gas system and air delivery systems. These control instruments and sensors are well known in the industry and therefore not illustrated.

With reference to FIG. 7, an optional ash grate 711 may be fitted below the gasifier vessel for bottom ash removal. The ash grate 711 may be used as a sifting device to remove any agglomerated particles so that the fluidizing media and unreacted char can be reintroduced into the gasifier for continued utilization. In one embodiment, a slide valve 713 operated by a mechanism to open the slide valve 714 is located beneath the ash grate 711 to collect the ash. In one embodiment, a second slide valve 713 and operating mechanism 714 are located below the cyclone separator 707.

As with the small format fluidized bed gasifier, some unreacted carbon is carried into the cyclone separator 707 with particle sizes ranging from 10 to 300 microns. When the solids are removed from the bottom of the cyclone, the ash and unreacted carbon can be separated and much of the unreacted carbon recycled back into the gasifier, thus increasing the overall fuel conversion to at least 95%. Ash accumulation in the bed of fluidizing media may be alleviated through adjusting the superficial velocity of the gases rising inside the reactor. Alternatively, bed media and ash could be slowly drained out of the gasifier base and screened over an ash grate 711 before being reintroduced back into the gasifier. This process can be used to remove small, agglomerated particles should they form in the bed of fluidizing media and can also be used to control the ash-to-media ratio within the fluidized bed.

With continued reference to FIG. 7, a feedstock such as but not limited to biosolid material can be fed into the gasifier by way of the fuel feed inlets 701 from more than one location on the reactor vessel 799 and wherein said fuel feed inlets 701 may be variably sized such that the desired volumes of feedstock are fed into the gasifier through multiple feed inlets 701 around the reactor vessel 799 to accommodate a continuous feed process to the gasifier. For the present invention and in one embodiment, the number of fuel feed inlets is between 2-4. The minimum number of feed inlets 701 is based, in part, on the extent of extent of back mixing and radial mixing of the char particles in the bed and on the inside diameter of the reactor bed section 704. For bubbling fluidized beds, one feed point could be provided per 20 ft$^2$ of bed cross sectional area. For example, and in one embodiment, if the reaction bed section has an internal diameter of 9 ft, the reactor vessel 799 will have at least 3 feed inlets 701 which may be located equidistant radially to maintain in-bed mixing. Feed inlets 701 may be considered all on one level, or on more than one level or different levels and different sizes.

FIG. 8A shows a cut away perspective view illustrating a pipe gas distributor of the biogasifier in accordance with an embodiment of the invention. FIG. 8B shows a side elevational view illustrating a pipe gas distributor of the biogasifier in accordance with an embodiment of the invention. In one embodiment, the invention has a pipe distributor design with a main air inlet 801, said main air inlet 801 having an upper portion 801A and lower portion 801B. In one embodiment, the lower portion 801B is connected a pipe 812 such as but not limited to an elbow or j-pipe. In one embodiment, the lower portion 801B is connected to a pipe 812 using a male mounting seal that is connected to a female mounting seal 803 that is connected to a female mounting stub that is connected to the pipe 812. In one embodiment, the pipe 812 has a proximal end 812A and terminal end 812B wherein the proximal end 812A is mechanically connected to the main air inlet 801 and the terminal end 812B is connected to the gas inlet 703. In one embodiment, the pipe 812B terminal end has a flange 811 to connect to the gas inlet 703.

The upper portion of the main air inlet 801A is aligned with and an opening in a center trunk line 806, said trunk line 806 having at least 10 lateral air branches 805 that are open on one end to the center trunk line and closed on the other end. In one embodiment the lateral air branches 805 are symmetrically spaced on either side of the center trunk line 806. In one embodiment, the lateral air branches 805 are of varying length to fit symmetrically within the diameter of the bottom of the reactor bed 204. In one embodiment, each of the lateral air branches 805 comprise downward pointing gas and air distribution nozzles 810 which are also called, gas and air distribution ports 810. The air distribution nozzles 810 are pointed downward so the air entering from the main air inlet 801 is injected in a downward motion into the cone-shaped bottom of the gasifier reactor 799. In one embodiment the distribution nozzles 810 point downward at an angle such as but not limited to a 45-degree angle. The configuration and general locations of nozzles and components differ from the tuyere design for the smaller reactor vessel in that fewer gas/air distribution nozzles are required in a tuyere design to meet the fluidization requirements and good mixing requirements but still enough to enable the full volume of the fluidizing media material to fluidize when slumped in the bottom cone section of the reactor. This is also an essential part of the reactor.

FIG. 9. shows a perspective view of multiple universal gasifier feeder systems connected to a gasifier in accordance with an embodiment of the invention. With reference to FIG. 9 the feedstock is gravity fed from a feed port 109 located on top to the feeder vessel 101. In one embodiment, the vessel 101 is rectangular shaped having three vertical sides and an angled side 110. The angled side 110 has a slope of no less than 60 degrees from the horizontal to facilitate proper flow of bio-feedstock materials that have different and/or variable flow properties. At least one side of the vessel 101 needs to be angled, although the vertical sides can also be between vertical and a have a negative angle between 0 and 15 degrees. The no less than 60-degree angle 110 together with aeration using aeration ports 107 (shown in FIG. 11) and other means such as inserting removable bridge breakers (not shown) located within the vessel 101 can assist with and modulate flow of vary feedstock.

The length of the live bottoms dual screw 102 and transfer screw 103 may vary and depend in the space available to locate the vessel 101 and distance to the gasifier 200. The transfer screw 103 may be equipped with a cooling jacket 104 shown in FIG. 1 in the event of the feedstock or feedstock combinations has a recommended minimum flammability temperature that requires the feedstock to be cooled. In one embodiment, the feed system 100 includes more than one transfer screw 103 that can operate as metering screws that are then connected to a transfer screw that can operate as a high-speed injection screw conveying the feedstock into the gasifier reactor vessel 299. In one embodiment, load cells or metering screw systems are used in place of the live bottoms dual screw and transfer screw to control the feed rate to the gasifier.

FIG. 10 shows a top view of multiple feeder systems 100 and a single gasifier reactor vessel 299 with sample screw connections and multiple feed points via the fuel deed inlets 201 in accordance with an embodiment of the invention.

FIG. 11 shows a side view of the universal gasifier feeder system 100 with a cut away view of a gasifier reactor vessel 299 to which the transfer screw 103 of the feeder system is attached via at least fuel feed inlet 201 of the gasifier 200 in accordance with an embodiment of the invention. In one embodiment, the transfer screw 103 terminates at the fuel feed inlet 201. In another embodiment, the transfer screw 103 protrudes into the bed section 204 of the reactor vessel 299. In this embodiment, sample bin capacity is shown as 3.5 tons of feedstock for a single feed vessel with an internal temperature of the feed vessel at 200° F. In one embodiment, the internal operating temperature of the gasifier reactor 299 is about 1200° F. Multiple sensors (not shown) can be included to monitor pressure and temperature within the reactor vessel. One such sensor such as feed level sensors 105. Another embodiment may also include a feed view port 108 located on the open bottom chute 111.

The location of the aeration ports 107 can be variable in size and location and on any side of the vessel. The number of ports 107 can also be increased or decreased depending on the type and number of bridge breaking features and size of the feed vessel 101. Adjustable aeration features that uses either air or an inert gas, assists with avoiding bridging and maintaining flow to the transfer screws 103. The feed vessel 101 terminates in an open bottom chute 111 and a live bottoms dual screw feeder design 102 is located below the chute 111. The screw feeder 102 conveys the feedstock to another open bottom chute 111 that drops the feedstock by gravity directly onto the transfer screw 103. The screw feeder 103 conveys the feedstock either to another transfer screw feeder 103 by the same gravity/chute mechanism or conveys the feedstock to a gasifier reactor 299 via a fluidized fuel feed inlet 201. The connection of the transfer screw 103 to the feed inlet 201 is mechanical such as by a flange 116 to flange 116 connection.

Figure 12:
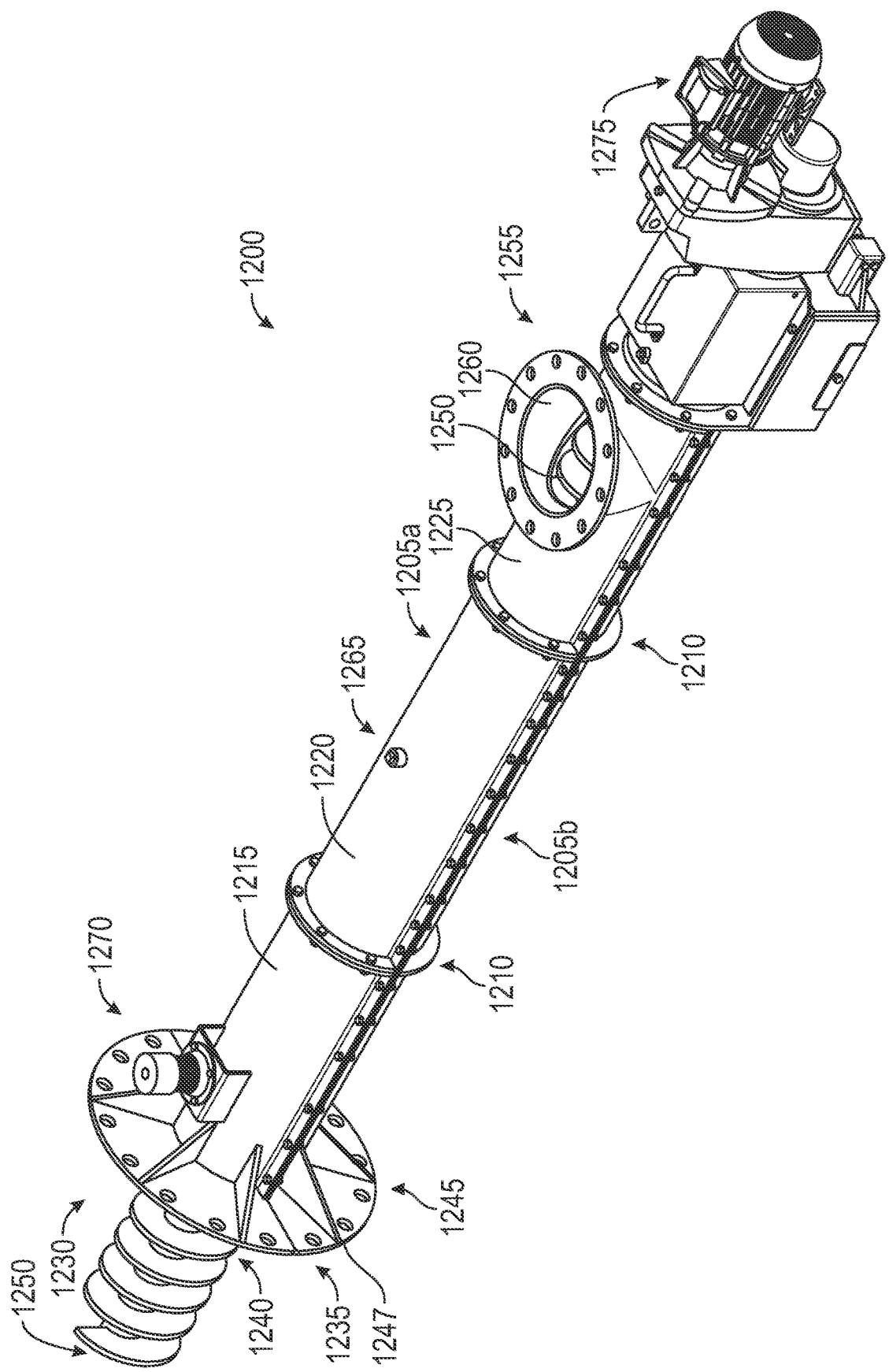
FIG. 12 shows a perspective view of an exemplary universal multi-section clamshell screw feeder pipe implementation configured with a top section and a bottom section designed to be separated during production operation, permitting access to the screw and the pipe interior for inspection, maintenance, and clearing blockages.

FIG. 12 shows a perspective view of an exemplary universal multi-section clamshell screw feeder pipe implementation configured with a top section and a bottom section designed to be separated during production operation, permitting access to the screw and the pipe interior for inspection, maintenance, and clearing blockages. In FIG. 12, the exemplary universal multi-section clamshell screw feeder pipe 1200 comprises the top section 1205a and the bottom section 1205b configured in a clamshell type design. In the implementation depicted by FIG. 12, the top section 1205a and the bottom section 1205b are bolted together. In the depicted implementation, the section flanges 1210 are split flanges joining the top section outlet segment 1215, the top section center segment 1220, and the top section inlet segment 1225 to form the top section 1205a. The connections between the section flanges 1210 may comprise gaskets designed to provide a gas-tight seal for the screw feeder pipe 1200 and maintain positive pressure from the feeder pipe into a reactor vessel such as a gasifier. The top section 1205a or the bottom section 1205b may comprise one or more segment. In the depicted implementation the outlet 1230 is configured with the outlet flange 1235 designed to couple the universal multi-section clamshell screw feeder pipe 1200 outlet 1230 with a reactor vessel. The reactor vessel may be, for example, a gasifier. In the depicted implementation, the outlet flange 1235 is a split flange comprising the outlet flange top 1240 and the outlet flange bottom 1245. In the depicted implementation the outlet flange top 1240 and the outlet flange bottom 1245 are separated by the flange split 1247. Separating the outlet flange top 1240 and the outlet flange bottom 1245 using the flange split 1247 permits access to the pipe interior and the screw 1250 during production operation. In the illustrated implementation, the universal multi-section clamshell screw feeder pipe 1200 may be opened for inspection and maintenance access to the pipe interior and the screw 1250, for inspection of the screw 1250, screw 1250 flight adjustment, cleaning the pipe in the event of blockage, and maintenance without having to remove the screw 1250. The depicted universal multi-section clamshell screw feeder pipe 1200 may be opened by unbolting and separating the pipe top section 1205a from the bottom section 1205b, and/or unbolting and removing any or all of the top section outlet segment 1215, the top section center segment 1220, or the top section inlet segment 1225. In the depicted implementation, the inlet flange 1255 is configured to connect the inlet 1260 to a feedstock feed. The feedstock feed may be received at the inlet 1260 from a feed vessel. In the implementation depicted by FIG. 12, the universal multi-section clamshell screw feeder pipe 1200 is configured to receive a feedstock feed at the inlet 1260 and move the feedstock through the pipe to the outlet 1230 using the screw 1250. The inlet 1260 may be operably coupled with a feedstock feed source using the inlet flange 1255. The inlet flange 1255 may be a split flange. The inlet flange 1255 and outlet flange 1235 may be configured to operably couple the screw feeder pipe 1200 with a feedstock feed source and a reactor vessel using one or more gasket. In an illustrative example, the gaskets may control or prevent gas from backflowing from the screw feeder pipe into a feed bin coupled with the inlet 1260. For example, in some exemplary scenarios an operational screw feeder pipe implementation in accordance with the present disclosure may experience a side pressure difference from a feedstock feed source such as a feed bin into a reactor vessel such as a gasifier connected to the screw feeder pipe. In such an exemplary scenario, the gasket may prevent gas from backflowing into the feed bin through the screw feeder pipe/transfer screw, as a result of a gas-tight seal provided by the gaskets. In an illustrative example, such an inlet gasket implementation may improve safety and reduce the chance of fire or explosion, as a result of preventing gas from backflowing from the reactor vessel or gasifier through the screw feeder pipe into a feed source. In the depicted implementation, the top section center segment 1220 is configured with the inspection port 1265 permitting visual, hand, or sensor/test instrument access to the interior of the pipe during production for material adjustment or measurement, without disassembling the pipe or halting operation. In the implementation depicted by FIG. 12, the top section outlet segment 1215 is configured with the sensor/switch port 1270 for measurement or process control sensor/switch access to the material flow in the pipe proximal to the outlet 1230. In the depicted implementation, the screw 1250 may be driven by the screw drive unit 1275. The screw 1250 may be driven by a motorized axle connected to the screw drive unit 1275.

A universal multi-section clamshell screw feeder pipe implementation in accordance with the teaching of the present disclosure may achieve one or more technical effect. For example, downtime may be reduced, and the availability of online access may increase, as a result of the disclosed universal multi-section clamshell screw feeder pipe design that permits more precise and efficient diagnosis and resolution of trouble (for example, to do maintenance work, repair or inspect) in a particular pipe section during production using one or more removable top section. For example, an exemplary universal multi-section clamshell screw feeder pipe implementation may improve efficiency of operational adjustments to screw flights by allowing access to the conveying screw for inspection and permit cleaning when blocked, as a result of a screw feeder pipe design providing one or more removable top section. Some implementations may improve case of replacing clamshell sections and permit optimizing screw feeder pipe design using more shorter or longer clamshell sections. In some design examples, an implementation using one or more removable top section may permit access to the feedstock flow for applying surface coatings to address stickiness or flow properties, for example, wood chips vs plastics vs biosolids, depending on the type of feedstock. Some implementations may permit changes to/additions of feed/view ports by modifying one or more clamshell section, based on removing a removable section and replacing the removable section with a new section modified to satisfy predetermined technical specifications. In some example designs, removing one or more removable clamshell section may reduce effort and improve safety when adding seals/seal material to feedstock during production to address feedstock related requirements, such as, for example, gas tightness, adjustment for temperatures, or fine sand attrition leaks.

Figure 13:
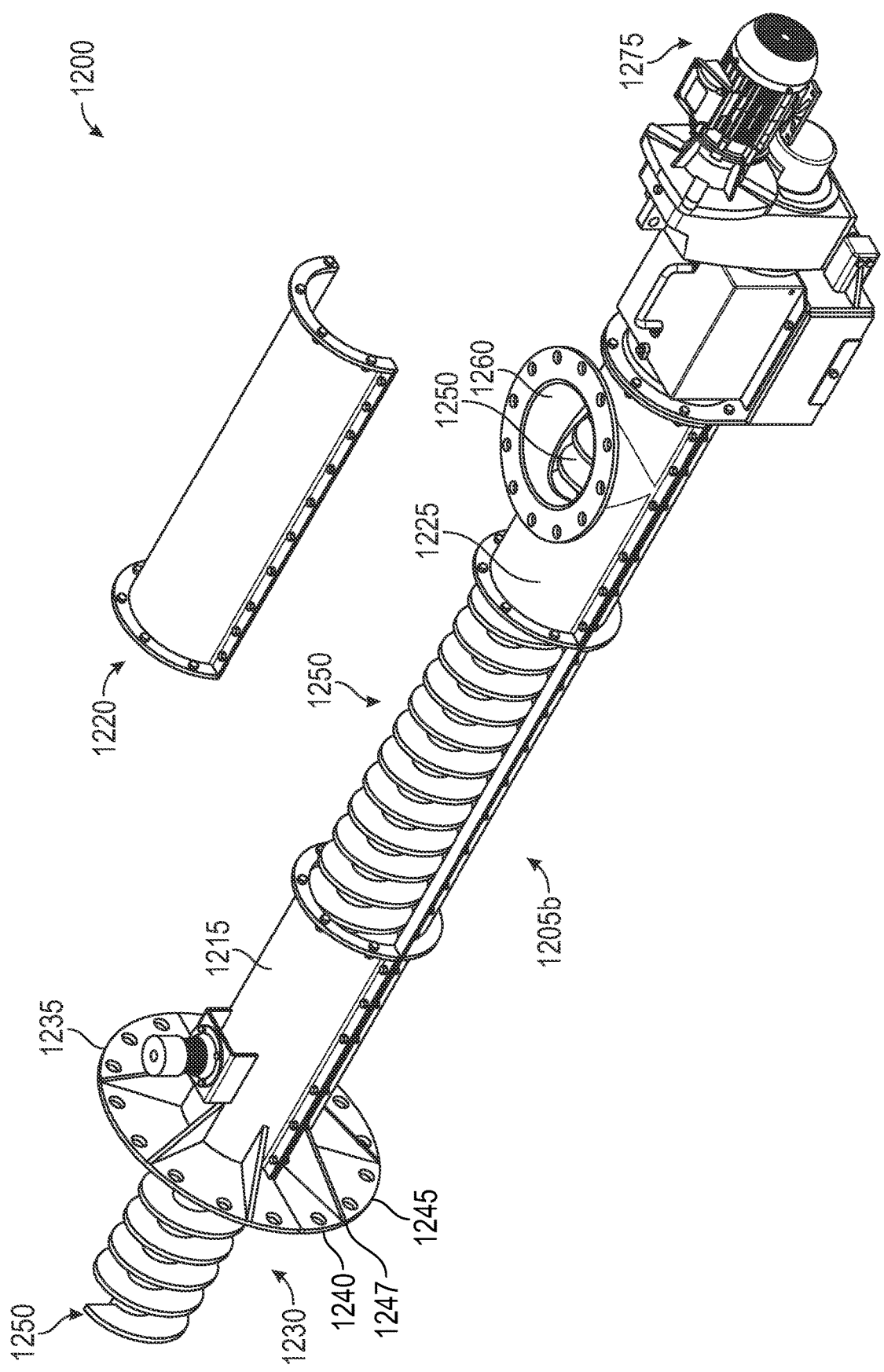
FIG. 13 shows a perspective view of the exemplary universal multi-section clamshell screw feeder pipe implementation depicted by FIG. 12 with one top section segment removed in an exemplary inspection/maintenance mode, providing access to the screw.

FIG. 13 shows a perspective view of the exemplary universal multi-section clamshell screw feeder pipe implementation depicted by FIG. 12 with one top section segment removed in an exemplary inspection/maintenance mode, providing access to the screw. In FIG. 13, the exemplary universal multi-section clamshell screw feeder pipe 1200 comprises the features described with reference to FIG. 12, and further comprises the top section center segment 1220 removed for access to the screw 1250. The screw 1250 may be configured with a motion sensor target 1405 or motion sensor (described with reference to FIG. 14B) to permit measuring the screw 1250 rotation during production for material or screw flight adjustment, without disassembling the pipe or halting operation.

FIG. 14A shows a perspective view of the interior of the top section of the exemplary universal multi-section clamshell screw feeder pipe implementation depicted by FIG. 12, in an exemplary disassembled mode. In FIG. 14A, the exemplary universal multi-section clamshell screw feeder pipe 1200 top section 1205a interior is depicted illustrating the underside of the top section 1205a. The inlet flange top 1305 is the top portion of the inlet flange 1315. The inlet flange 1315 is a split flange.

FIG. 14B shows a perspective view of the interior of the bottom section of the exemplary universal multi-section clamshell screw feeder pipe implementation depicted by FIG. 12, in an exemplary disassembled mode. In FIG. 14B, the exemplary universal multi-section clamshell screw feeder pipe 1200 bottom section 1205b interior is depicted illustrating access to the screw 1250. In the depicted implementation the inlet flange bottom 1310 is the bottom portion of the split inlet flange 1315. In the implementation depicted by FIGS. 14A-14B, the screw 1250 is configured with the motion sensor target 1405. The motion sensor target 1405 may be configured in a flight of the screw 1250. The motion sensor target 1405 may be configured in a portion of the screw 1250 enclosed by the pipe top section 1205a or the bottom section 1205b. The motion sensor target 1405 may be an optical target designed with optically reflective material configured to reflect invisible light or visible light. The motion sensor target 1405 may comprise an electronic sensor configured to sense motion of the screw 1250 and convert the screw 1250 motion to an electronic signal encoding the motion of the screw 1250. The motion sensor may communicate the electronic signal encoding screw 1250 motion to an operator or a control system. The screw 1250 motion sensor may comprise, for example, an accelerometer, or a proximity sensor. The screw 1250 motion sensor may be a proximity sensor configured to send a signal indicating the sensor's proximity to a stationary object, to indicate the rotation of the screw 1250 as the screw 1250 rotates. An implementation in accordance with the present disclosure may use the screw 1250 motion sensor target or motion sensor to indicate the screw 1250 is rotating, and to determine the screw 1250 rotation speed, or determine the rate of material flow into a reactor vessel during production operation without opening the screw feeder pipe. The motion sensor target 1405 or motion sensor may be configured in the screw 1250 to be accessible using the sensor/switch port 1270 or the inspection port 1265 (depicted, for example, by FIG. 12) to permit measuring the screw 1250 rotation during production for material or screw flight adjustment, without disassembling the pipe or halting operation.

FIG. 15A shows a side view of three top section segments of the exemplary universal multi-section clamshell screw feeder pipe implementation depicted by FIG. 12, in an exemplary disassembled mode. In FIG. 15A, the top section outlet segment 1215, the top section center segment 1220, and the top section inlet segment 1225 are each configured with the respective handles 1505. The top section outlet segment 1215, the top section center segment 1220, and the top section inlet segment 1225 may be configured with respective hinges permitting opening the respective segments by lifting the handles. The top section outlet segment 1215, the top section center segment 1220, and the top section inlet segment 1225 may be individually bolted, hinged, bolted or hinged, or bolted and hinged, to be opened with the respective handles 1505. The handles 1505 may be located on the side or the top of the respective top section outlet segment 1215, the top section center segment 1220, and the top section inlet segment 1225.

FIG. 15B shows a side view of the exemplary universal multi-section clamshell screw feeder pipe implementation depicted by FIG. 12, in an exemplary assembled mode.

Figure 15C:
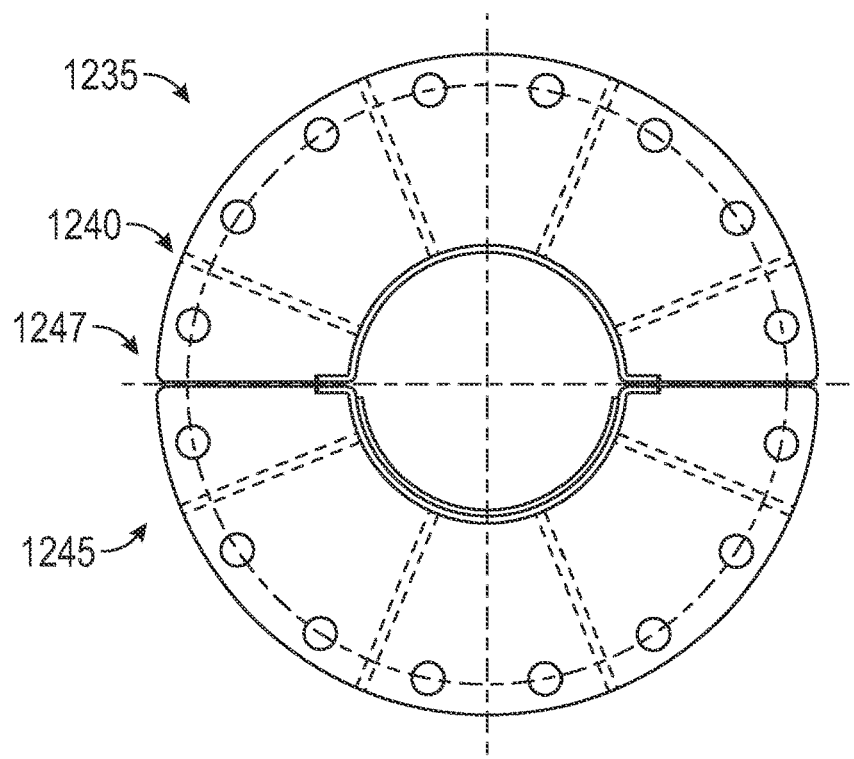
FIG. 15C shows a front view of an exemplary outlet flange designed with a top and bottom for use with the top and bottom section of the exemplary universal multi-section clamshell screw feeder pipe implementation depicted by FIG. 12.

FIG. 15C shows a front view of an exemplary outlet flange designed with a top and bottom for use with the top and bottom section of the exemplary universal multi-section clamshell screw feeder pipe implementation depicted by FIG. 12. In FIG. 15C, the flange split 1247 permits separating the outlet flange top 1240 from the outlet flange bottom 1245.

Figure 16:
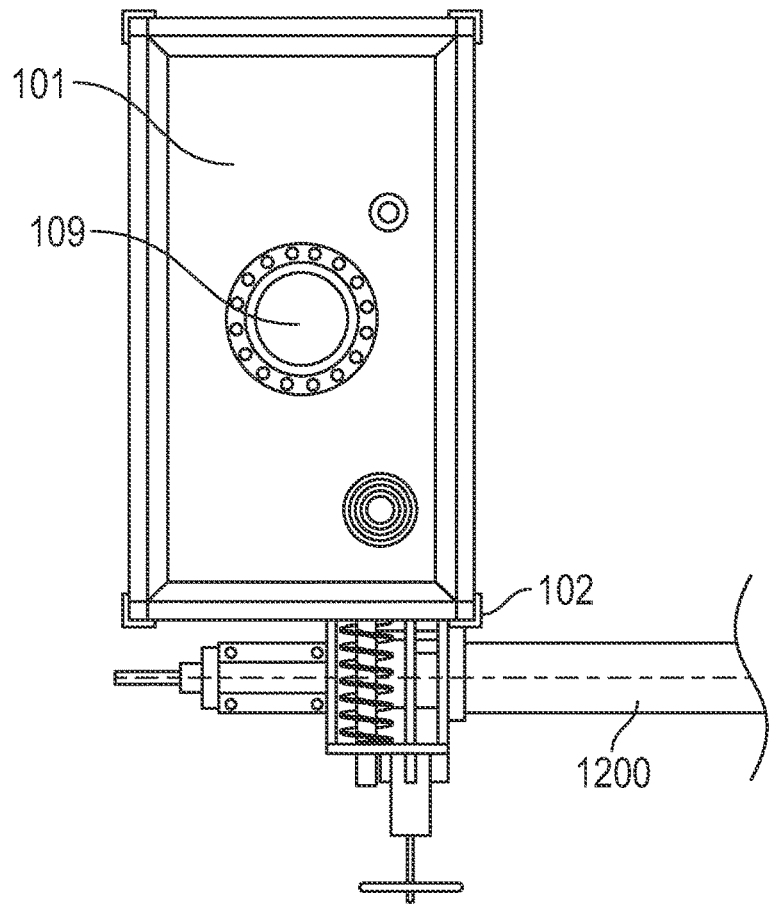
FIG. 16 shows an exemplary universal multi-section clamshell screw feeder pipe implementation configured to transfer a feedstock feed from a feed vessel to a reactor vessel.

FIG. 16 shows an exemplary universal multi-section clamshell screw feeder pipe implementation configured to transfer a feedstock feed from a feed vessel to a reactor vessel. In FIG. 16, the feed vessel 101 is configured to receive feedstock using the feed vessel port 109. The live bottom dual screw feeder 102 is operably coupled with the feed vessel 101. The universal multi-section clamshell screw feeder pipe 1200 is configured to move a feedstock feed from the live bottom dual screw feeder 102 to a reactor vessel configured to be operably coupled with the universal multi-section clamshell screw feeder pipe 1200. The reactor vessel may be a gasifier.

Figure 17:
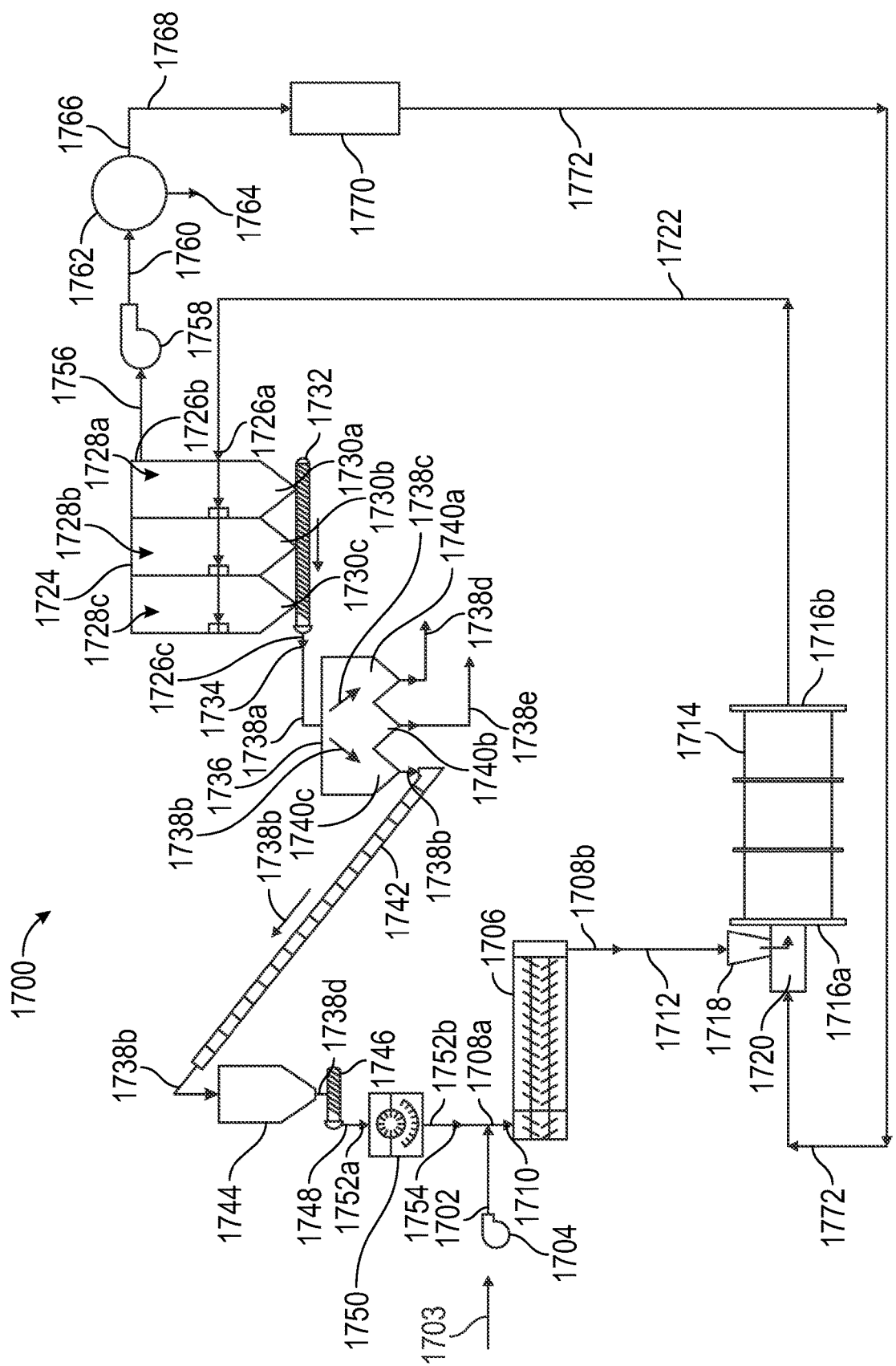
FIG. 17 shows an exemplary particle size control (PSC) system configured to resize oversized pellets from a recycle portion of an uncontrolled size dried pellet stream to produce a controlled size dried seed material recycling stream and mix the controlled size dried seed material recycling stream with new incoming wet granular biosolids from an incoming wet granular biosolids stream.

In FIG. 17 the exemplary particle size control (PSC) system 1700 is configured to resize oversized pellets from a recycle portion of an uncontrolled size dried pellet stream 1738*b* to produce a controlled size dried seed material recycling stream 1754 and mix the controlled size dried seed material recycling stream 1754 with new incoming wet granular biosolids 1703 from an incoming wet granular biosolids stream 1702. The PSC system 1700 receives the incoming wet granular biosolids stream 1702 from the PSC system inlet 1704. The mixer 1706 comprises the mixer inlet 1708*a* operably coupled with the PSC system inlet 1704 to receive the mixer input stream 1710. The mixer 1706 may be any solids mixer operable to mix and/or blend the dry pellets with wet material. In the depicted example the mixer input stream 1710 comprises the incoming wet granular biosolids stream 1702 merged with the controlled size dried seed material recycling stream 1754. The PSC system 1700 is configured to mix a controlled size recycled pellet stream with an incoming wet biosolids stream. In an illustrative example, when the PSC system 1700 is started the mixer input stream 1710 may comprise only the incoming wet granular biosolids stream 1702 until the recycle portion of the uncontrolled size dried pellet stream 1738*b* is generated as disclosed herein below. In the depicted example the mixer 1706 is a pugmill mixer. The mixer outlet 1708*b* provides the wet coated seed material stream 1712 comprising the incoming wet granular biosolids stream 1702 mixed with the controlled size dried seed material recycling stream 1754.

With continued reference to FIG. 17, the wet coated seed material stream 1712 is supplied to the dryer 1714 through the dryer inlet 1716*a* using the dryer inlet chute 1718. The dryer 1714 dries the wet coated seed material stream 1712 using hot air supplied to the dryer inlet mixing chamber 1720. The dryer 1714 emits the moist air and uncontrolled size dried pellet stream 1722 from the dryer outlet 1716*b*. The moist air and uncontrolled size dried pellet stream 1722 may comprise a Class A pellet stream. The depicted dryer 1714 may be a rotary drum dryer. The dryer 1714 may be configured to implement a separator based on configuring the dryer 1714 to permit the uncontrolled size dried pellet stream 1722 to drop out from the dryer 1714. The bottom of the dryer 1714 may be operably coupled with a diverter to permit diverting a portion of the uncontrolled size dried pellet stream 1722 for recycling. The dryer outlet 1716*b* may be operably coupled with a cyclone or other type of separator configured to separate the uncontrolled size dried pellet stream from the moist air and uncontrolled size dried pellet stream 1722.

In the exemplary implementation depicted by FIG. 17, the dryer outlet 1716*b* is operably coupled with the cyclone 1724 via the cyclone system inlet 1726*a*. The exemplary cyclone 1724 comprises the outlet 1726*b* configured to emit substantially a moist air stream separated from the moist air and uncontrolled size dried pellet stream 1722 by the cyclone 1724. The exemplary cyclone 1724 further comprises the outlet 1726*c* configured to emit substantially an uncontrolled size dried pellet stream separated from the moist air and uncontrolled size dried pellet stream 1722 by the cyclone 1724. In the exemplary implementation depicted by FIG. 17, the cyclone comprises a first section 1728*a*, a second section 1728*b* and a third section 1728*c*. The cyclone 1724 first section 1728*a*, second section 1728*b* and third section 1728*c* are respectively coupled with the cyclone 1724 first section outlet 1730*a*, second section outlet 1730*b* and third section outlet 1730*c*. The cyclone 1724 separates the uncontrolled size dried pellet stream 1734 from the moist air and uncontrolled size dried pellet stream 1722 and emits the separated uncontrolled size dried pellet stream 1734 to the cyclone conveyor screw 1732. The uncontrolled size dried pellet stream 1734 may comprise a Class A pellet stream.

With continued reference to FIG. 17, the diverter 1736 receives the uncontrolled size dried recycle pellet stream 1734 as the diverter inlet stream 1738*a*. The diverter 1736 is configured to divert the recycle portion of the uncontrolled size dried pellet stream 1738*b* from the uncontrolled size dried pellet stream 1734 through the diverter recycle stream outlet 1740*c*. The diverter 1736 is configured to divert the remainder portion of the uncontrolled size dried pellet stream 1738*c* to an outlet. The diverter 1736 may divert a portion of the remainder portion of the uncontrolled size dried pellet stream 1738*c* to more than one outlet. In the depicted example the diverter 1736 is configured to divert one portion of the uncontrolled size dried pellet stream 1738*c* to the gasifier feedstock stream 1738*d* through the diverter gasifier feedstock stream outlet 1740*a*. The diverter 1736 is configured to divert another portion of the uncontrolled size dried pellet stream 1738*c* to the loadout silo stream 1738*e* through the diverter loadout silo stream outlet 1740*b*. The diverter 1736 may be configured or adjusted to divert variable portions of the diverter inlet stream 1738*a* to various outlets from the diverter 1736 in accordance with what would be known by one of ordinary skill. In some implementations a portion of the total uncontrolled size dried pellet stream 1738*b* may be recycled back to the dryer 1714 to act as a dry seed material recycle source for dried pellets, to combine with the wet granular biosolids stream supplied to the rotary drum dryer. For example, the diverter 1736 may be configured to divert the portion of the total uncontrolled size dried pellet stream 1738*b* back to the dryer 1714.

With continued reference to FIG. 17, the recycle conveyor 1742 transports the recycle portion of the uncontrolled size dried pellet stream 1738b to the recycle surge bin 1744. The recycle surge bin 1744 is configured to pool the uncontrolled size dried pellet stream 1738b for staging to the live bottom screw 1746. In the implementation depicted by FIG. 17, the uncontrolled size dried pellet stream 1738b flows as the unsized input stream 1748 down from the live bottom screw 1746 into the top of the variable speed rotary crusher 1750. In the depicted implementation the variable speed rotary crusher 1750 is positioned below and inline with the unsized input stream 1748 permitting the unsized input stream 1748 to fall down into the variable speed rotary crusher 1750 inlet 1752a. The rotary crusher 1750 is configured to resize oversized pellets from the recycle portion of the uncontrolled size dried pellet stream 1738b to produce a controlled size dried seed material recycling stream 1754, using a screen 1820 having apertures 1845 sized to retain the oversized pellets in the variable speed rotary crusher 1750 until the oversized pellets are crushed to produce reduced size pellets that fall through the screen. The rotary crusher 1750 is described with reference to FIGS. 18-20. In the depicted implementation the variable speed rotary crusher 1750 inlet 1752a is configured in the crusher top 1830, depicted at least in FIGS. 18-19. The variable speed rotary crusher 1750 emits the controlled size dried seed material recycling stream 1754 to the mixer 1706 through the mixer inlet 1708a. The mixer 1706 mixes the controlled size dried seed material recycling stream 1754 with new incoming wet granular biosolids 1703 from the incoming wet granular biosolids stream 1702. The mixer 1706 replenishes the wet coated seed material stream 1712 with the mixed controlled size dried seed material recycling stream 1754 and the new incoming wet granular biosolids 1703.

With continued reference to FIG. 17, the cyclone 1724 emits the separator system outlet stream 1756 comprising moist air separated from the moist air and uncontrolled size dried pellet stream 1722 by the cyclone 1724. In the implementation depicted by FIG. 17, the blower 1758 emits the blower air stream 1760 into the condenser 1762. The blower air stream 1760 may comprise moist air. The blower air stream 1760 temperature may be approximately 200° F. The condenser 1762 is configured to condense and cool the blower air stream 1760 to produce a water ($H_2O$) stream 1764 and the saturated air stream 1768. The temperature of the saturated air stream 1768 may be approximately 110° F. In the implementation depicted by FIG. 17, the saturated air stream 1768 is supplied to the heat exchanger 1770. The heat exchanger 1770 heats the saturated air stream 1768. The heat exchanger 1770 emits the heated saturated air stream 1768 as the hot air stream 1772. The temperature of the hot air stream 1772 may be at least 900° F. The heat exchanger 1770 may be thermally coupled with a heat source operating at sufficient temperature to heat the saturated air stream 1768 to approximately 900° F. For example, the heat exchanger 1770 may be thermally coupled with a gasifier configured to have a gasifier operating temperature of at least 900° F. The hot air stream 1772 is supplied to the dryer 1714 through the dryer inlet mixing chamber 1720.

Figure 18:
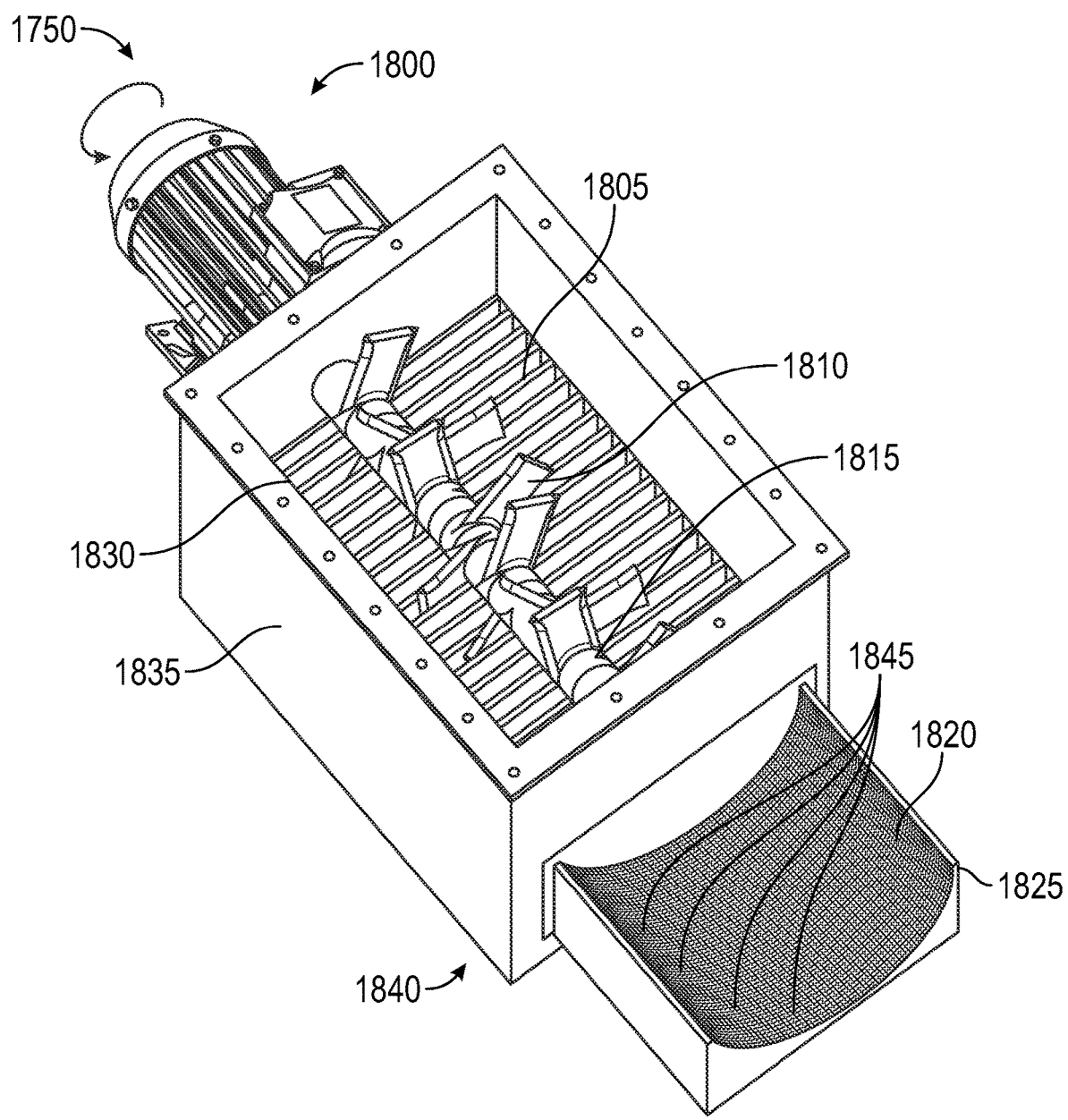
Figure 19:
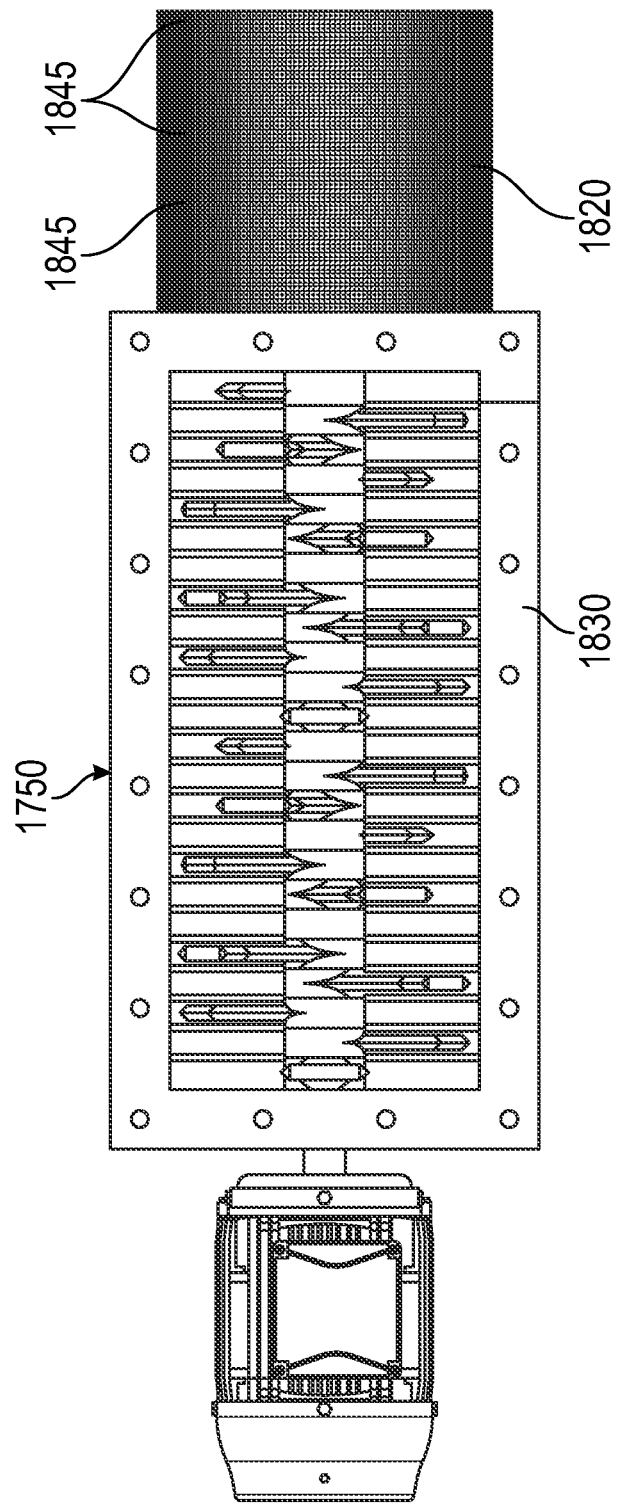

In FIGS. 18, 19 and 20 the exemplary variable speed crusher 1750 is configured with the screen 1820 having apertures 1845 sized to retain the oversized pellets in the variable speed rotary crusher 1750 until the oversized pellets are crushed to produce reduced size pellets that fall through the screen 1820. In FIG. 18, the depicted variable speed rotary crusher 1750 includes the motor 1800. The motor 1800 may be a variable speed motor. The variable speed motor may be configured with a speed controller. The speed controller may be operably coupled with an operator control or a computer-implemented system configured to adjust the speed of the motor 1800. Adjusting the speed of the motor 1800 in the particle size control (PSC) system 1700 may control pellet size in the controlled size dried seed material recycling stream 1754 (depicted by FIG. 17). The variable speed rotary crusher 1750 depicted in FIG. 18 includes the crusher grate 1805. The crusher grate 1805 includes multiple cross-members comprising rods or beams arranged in a parallel sequence across the length of the crusher 1750. Pairs of cross-members, rods or beams in the crusher grate 1805 define openings through the bottom of the crusher 1750. The openings permit material sized to fit through the openings to fall through the bottom of the crusher 1750.

The crusher 1750 is a rotary crusher configured with crusher blades 1810 connected to the crusher shaft 1815. The motor 1800 causes the shaft 1815 to rotate. The shaft 1815 rotation causes the blades 1810 to crush material retained within the crusher 1750. The depicted crusher 1750 is designed to produce controlled size material particles that drop through the crusher grate 1805 and through the screen 1820. The screen 1820 is configured with apertures 1845 sized to retain oversized product in the variable speed rotary crusher 1750 between the crusher sides 1835 until the oversized product is crushed by the rotary crusher blades 1810 to produce reduced size material that falls through the screen. In the depicted example the screen 1820 is removably secured by the screen tray 1825 in the crusher 1750. The screen tray 1825 may be removed from the crusher 1750 permitting the screen 1820 to be cleaned or replaced. In an illustrative example various screens 1820 may have apertures 1845 of different sizes. The size of the apertures 1845 in the screen 1820 may be selected to control the particle size of material crushed by the crusher 1750. For example the screen 1820 having apertures 1845 of one size may be replaced with another screen 1820 having apertures 1845 of a particular size determined to retain oversized product in the variable speed rotary crusher 1750 until the oversized product is crushed by the rotary crusher blades 1810. In the depicted example, the crusher 1750 is configured to receive material to be resized through the crusher top 1830 and emit the resized material through the crusher bottom 1840.

An exemplary method may comprise: (a) drying a wet coated seed material stream (1712) comprising an incoming wet granular biosolids stream (1702) to produce a moist air and uncontrolled size dried pellet stream (1722), using a dryer (1714); (b) separating an uncontrolled size dried pellet stream (1734) from the moist air and uncontrolled size dried pellet stream (1722), using a separator; (c) diverting a recycle portion of the uncontrolled size dried pellet stream (1738b) from the uncontrolled size dried pellet stream (1734), using a diverter (1736); (d) diverting a remainder portion of the uncontrolled size dried pellet stream (1738c) to an outlet, using the diverter (1736); (e) resizing oversized pellets from the recycle portion of the uncontrolled size dried pellet stream (1738b) to produce a controlled size dried seed material recycling stream (1754), using a variable speed rotary crusher (1750) configured with a screen (1820) having apertures (1845) sized to retain the oversized pellets in the variable speed rotary crusher (1750) until the oversized pellets are crushed to produce reduced size pellets that fall through the screen; (f) mixing the controlled size dried seed material recycling stream (1754) with new incoming wet granular biosolids (1703) from the incoming wet granular biosolids stream (1702) to replenish the wet coated seed material stream (1712), using a pugmill (1706); and (g) repeating steps a-f.

The dryer (1714) may be a rotary dryer.

The separator may further comprise a cyclone (1724).

The dryer (1714) may be configured to implement the separator based on configuring the dryer (1714) to permit the uncontrolled size dried pellet stream (1722) to drop out.

The method may further comprise mounting the variable speed rotary crusher (1750) inline and below the uncontrolled size dried pellet stream (1738*b*).

The method may further comprise adjusting speed of the variable speed rotary crusher (1750) to control pellet size in the controlled size dried seed material recycling stream (1754).

The pellet size may be controlled within a pellet size distribution predetermined to avoid screen (1820) blockage by oversize pellets and limit down time and throughput interruption for cleaning or adjusting the screen (1820).

The uncontrolled size dried pellet stream (1722) may further comprise Class A biosolids, and wherein the method further comprises diverting approximately 40% of the uncontrolled size dried pellet stream (1722) to be recycled.

The method may further comprise diverting the recycle portion of the uncontrolled size dried pellet stream (1738*b*) to a recycle feed bin (1744) disposed vertically above the pugmill (1706), wherein the recycle portion of the uncontrolled size dried pellet stream (1738*b*) may be dropped vertically into a chute to be metered into the pugmill (1706) and mix with the incoming wet granular biosolids stream (1702).

The method may further comprise configuring the recycle portion of the uncontrolled size dried pellet stream (1738*b*) inline and vertically above an inlet of the variable speed rotary crusher (1750) to permit the oversized pellets to fall into the variable speed rotary crusher (1750) to be crushed to a size within a predetermined pellet size distribution.

The method may further comprise configuring the outlet to be operably coupled with a gasifier and diverting a portion of the remainder portion of the uncontrolled size dried pellet stream (1738*c*) to the gasifier.

The method may further comprise configuring the outlet to be operably coupled with a load out silo and diverting a portion of the remainder portion of the uncontrolled size dried pellet stream (1738*c*) to the load out silo.

The method may further comprise the screen (1820) having apertures (1845) sized to control top size of the controlled size dried seed material recycling stream (1754) to be from 3 to 5 mm in diameter.

The method may further comprise heating the dryer (1714) using hot air (1772) heated by a heat exchanger (1770) configured to be thermally coupled with a gasifier configured to have a gasifier operating temperature of at least 900° F.

The method may further comprise cooling moist air (1756) from the separator to produce a saturated air stream (1768), using a condenser (1762), and supplying the saturated air stream (1768) to the heat exchanger (1770) to be heated.

An exemplary apparatus configured to crush oversized recycled dried pellets may comprise: a rotary drum dryer (1714) having a recycled dried pellet dryer-outlet (1716*b*) and a dryer-inlet (1716*a*); a pellet crusher (1750) comprising: a pellet crusher-inlet (1752*a*) operably coupled to the recycled dried pellet dryer-outlet (1716*b*); at least one sizing screen (1820) operably coupled to the pellet crusher-inlet (1752*a*) and configured to reduce oversized recycled dried pellets to a required size distribution based on crushing the oversized recycled dried pellets; a pellet crusher-outlet (1752*b*); a speed controller operably coupled to the pellet crusher (1750); a mixer (1706) having a first mixer-inlet (1708*a*) operably coupled to the pellet crusher-outlet (1752*b*) and a mixer-outlet (1708*b*) operably coupled inline to the dryer-inlet (1716*a*); and a source for a wet material operably coupled to the first mixer-inlet (1708*a*), wherein the first mixer-inlet is configured to receive the wet material from the source for wet material merged with controlled size recycled pellets from the pellet crusher-outlet (1752*b*), and wherein the mixer coats the controlled size recycled pellets with the wet material to a consistent size and a desired moisture content.

The mixer (1706) may be a pugmill mixer.

The apparatus may further comprise a recycled dried pellets bin (1744) placed and operably coupled between the oversized recycled dried pellets and the pellet crusher-inlet (1752*a*).

The apparatus may further comprise the pellet crusher (1750) located under the recycled dried pellets bin (1744), wherein the pellet crusher (1750) can reduce the oversized recycled dried pellets before ingress into the first mixer-inlet.

The oversized recycled dried pellets may further comprise Class A biosolids recycled seed material.

Although multiple implementations have been described with reference to the Figures, other implementations are possible. For example, exemplary particle size control system designs contemplate installing a pellet crushing assembly directly under the recycle feed source, mounted horizontally across the vertical feed chute to a pug mill. The mounting location in the chute may be directly above the discharge of the wet material to be dried, to allow for proper blending in the pug mill.

Various particle size control system implementations may achieve one or more technical effects. For example some implementations may reduce equipment cost and operator effort configuring and installing an exemplary system. Such reduced equipment cost and configuration effort may be a result of a particle size control system incorporating a direct inline apparatus to crush oversized recycled pellets to generate a seed material with an appropriate particle size distribution, instead of requiring a separate screening and crushing system prior to recycling seed material. This results in a simplified installation that avoids having a separate screening, crushing, and handling step for conditioning recycled Class A seed material for drying. Some particle size control system implementations may reduce the space required for configuring and operating an exemplary system. This facilitation may be a result of a particle size control system implementation designed to combine the crushing and sizing steps in one apparatus and by way of changing the speed of the crushing system and/or changing out the integral particle screens on the crusher discharge side, allowing for a more compact installation and simplifying the process of recycling. For example, the disclosed inline crushing/resizing apparatus also eliminates double handling of recycled pellets, reducing energy and time spent processing the pellets a second time outside the production path as was done in the traditional industry approach. Some implementations may provide a stable particle size distribution that increases uptime and reduces the chance of environmental damage that may result from oversized particles clogging a dryer and shutting down a plant. Such increased operating efficiency and safety may be a result of a particle size control system implementation designed for adjusting and controlling the particle size distribution of recycle material.

In illustrative examples of particle size control system implementations' design and usage, the delumper/crusher may be integrated inline between the Class A recycle feed and the pugmill. The delumper/crusher may be a multi-function delumper configured to control particle size. The sizing screen may be configured to control the maximum pellet size. The screen aperture size may range from 5 mm to 14 mm. The delumper/crusher may be configured with a speed control system to permit adjusting particle size and limiting dust generation to avoid screen blockage and limit down time for cleaning, interrupting throughput and possibly shutting down the plant.

In an illustrative example an exemplary particle size control system implementation may receive deliveries of wet dewatered sludge cake sourced from a municipal sewage treatment plant. The moisture content is typically between 18 to 25% solids, with the majority of the composition being water. To dry the wet biosolids in a rotary drum dryer, it may be necessary to blend the wet biosolids with a dry seed material. The seed material gets coated with the wet biosolids in a pug mill that mixes the wet and dry materials and feeds particles into a hot air stream entering the rotary drum dryer. The air velocity of hot air exiting the rotating dryer may be designed to lift the dry pellets vertically to a cyclone where the solids are removed from the now moist air stream. A portion of the dried biosolids (now referred to as Class A biosolids) may be diverted to be recycled back to a recycle feed bin above the pugmill, where they are metered into a chute that drops vertically into the pugmill and mixed with the wet biosolids. Approximately 40% of the Class A exiting the dryer may be recycled. Ideally the particle size exiting the dryer is smaller than 3 to 4 mm in diameter, which is an optimum seed size. However each time a particle is recycled, it gets coated with wet biosolids and the diameter increases. After multiple recycles, the diameter gets too large. For example, the particles may be too large to be separated from the moist air and pellet stream from the dryer and start backing up in the dryer outlet resulting in a shutdown of the dryer. The traditional industry approach has been to screen all of the Class A pellets to remove oversized particles and send the oversized pellets to a crusher to reduce the size to an appropriate seed material size prior to recycling back to the dryer pugmill. This separate screening and crushing train in the traditional industry plant design is inefficient, dangerous and time consuming. ARIES solutions disclosed herein contemplate an inline system configured to crush oversized particles in the production biosolids stream without shutting down or interrupting the processing, rather than having a completely stand-alone screening and crushing system in a screening and crushing train separate from the production biosolids stream. ARIES inline size control solution places a delumper/crusher configured to control particle size directly below the recycle bin for dried pellets that would allow for reducing oversized pellets as they were metered to the pugmill. ARIES solutions effectively and efficiently control particle size of Class A materials passed through a delumper/crusher at different speeds and with different internal screen sizes. The disclosed solution controls crushed Class A material particle size within a particle size distribution that eliminates problems with oversized particles.

An exemplary particle size control system implementation may eliminate using the conventional competitive stand-alone process tied to the main process using a separate independent multi-step system consisting of intermediate storage, feeding equipment and separate crushing and sizing equipment. Eliminating the use of the conventional competitive stand-alone process tied to the main process using a separate independent multi-step system consisting of intermediate storage, feeding equipment and separate crushing and sizing equipment, may be a result of a particle size control system implementation designed to integrate an inline single step feed size control system apparatus (direct and multi-function). The exemplary particle size control system disclosed herein improves the size control function compared with the conventional technology and makes the process faster, with fewer components, less waste and improved throughput resulting from reduced downtime. Current contemplated approaches providing for this process intensification and inline level of process do not exist.

For example, an exemplary particle size control system implementation may integrate an inline crusher or delumper to control the particle size of dry pellets recovered from a rotary drum dryer. The particulate dried sludge is at the required size specification required for feed to the ARIES proprietary Fluidized Bed gasifier. The dry pellets are discharged from the rotary drum dryer outlet and are recycled back to a rotary drum dryer intake mixer to act as seed material in the preparation of the dryer feed material by combining with the wet material to be dried. The delumper/crusher is mounted inline and below a recycle source for dried pellets, that meters dried and unsized granular material into a rotary crusher, where the use of speed, classifiers, and internally affixed screens reduces the dried pellets to a required size distribution that is mixed with incoming wet material as the two streams enter into a pug mill. The invention generates no waste and allows recovery and use of all material for processing.

The disclosed particle size control system 1700 (described with reference to FIG. 17) establishes a consistent size dry particle that will not grow further than the allowable tolerance increase produced by the wet sludge coating deposited on each dry particle every cycle. When the equilibrium is reached, the dryer consistently produces a dry biosolids particles that does not exceed the maximum particle size specification. The delumper's function is to maintain the size below that spec cycle after cycle. The minimum size is not a problem since the gasifier becomes more carbon conversion efficient with smaller particle distributions and the commensurate increase in surface area. This is also why there is no residual waste generated; because all the product can be gasified faster and more efficiently. All of the material from the delumper is used for mixing with wet sludge/biosolids feed. A portion of the raw product from the dryer is recycled to the pugmill. The rest is sent to the gasifier or the storage bin.

A pug mill may be used to mix and blend the introduced wet material to be dried with a recycled dry material that acts as a seed material to be coated with the wet material. This process obtains a consistent feed size and desired moisture content to be introduced into the inlet of a rotary drum dryer. If the size of the dry material entering the pugmill and subsequently entering into the dryer is not crushed and controlled, the particles will grow larger every time the material is recycled. After numerous recycling cycles without crushing, the material fed to the dryer and exiting will grow too large. The traditional approach used in the industry for producing dried pellets with a rotary drum dryer that requires a recycled seed material, was to install a separate equipment train to screen out oversized and undersized pellets and fines. In this traditional approach the oversized pellets would then be separately crushed, combined with the undersized cut and recycled to the inlet of a pug mill. Some material loss occurred in this traditional process because of the separate steps. The traditional industry approach in use does not incorporate a direct inline system to crush oversized recycled dried pellets.

The screen 1820 allows only certain desired top size particles to pass through. The screen 1820 may be swapped out to change the screen size (aperture size) depending on the desired top size we want to make. The top size is dictated by the gasifier needs. For larger gasifiers we may want to accommodate larger particles to avoid recycling dust produced from abrasion in the solids recycle transport equipment. Biosolids are relatively fragile. In this case it is to guard against dust moving the particles and flammability risk, not gasifier performance. The screen 1820 may be one or more screens with various aperture sizes. For example multiple screens 1820 may be stacked in layers with different aperture sizes and/or aperture shapes in each layered screen. In this example effective screen aperture size may be adjustable by incrementally sliding a screen with round apertures over a screen with larger apertures, to open or close more or less aperture surface area and control retention time in the crusher.

An exemplary apparatus or method implementation may comprise a universal feeder system configured with a transfer screw feeder within a multi-section clamshell pipe permitting access to the feed screw and pipe interior for inspection, maintenance and/or cleaning during production, without disassembly or screw removal. The clamshell screw feeder pipe provides access to the screw by opening or removing the multi-section top portion of the clamshell pipe. The top pipe section is bolted and or hinges to the bottom portion of the clamshell pipe. The number of segmented multiple clamshell top sections depends on the length of the screw. One or more clamshell top sections may be configured with an inspection port. The universal feeder system configured with a transfer screw feeder within a multi-section clamshell pipe transfers feedstock feed from one or more feed vessels to one or more reactor vessel.

Defined herein are exemplary apparatus embodiments and methods for a universal feeder system configured with a transfer screw feeder within a multi-section clamshell pipe permitting access to the feed screw and pipe interior for inspection, maintenance and/or cleaning during production, without disassembly or screw removal. The clamshell screw feeder pipe provides access to the screw by opening or removing the multi-section top portion of the clamshell pipe. The top pipe section is bolted and or hinges to the bottom portion of the clamshell pipe. The number of segmented multiple clamshell top sections depends on the length of the screw. One or more clamshell top sections may be configured with an inspection port. The universal feeder system configured with a transfer screw feeder within a multi-section clamshell pipe transfers feedstock feed from one or more feed vessels to one or more reactor vessel.

An exemplary implementation may comprise a standardized feeder system designed for a gasifier system to enable different feedstock materials to be fed to existing gasification reactors without having to custom design the feed system or integrate the feeder into the reactor. An exemplary universal feeder system implementation may be combined with a fluidized bed gasification reactor for the treatment of multiple or mixed feedstocks including but not limited to sewage sludge, municipal solid waste, wood waste, refuse derived fuels, automotive shredder residue and non-recyclable plastics, thereby also illustrating a method of gasification for multiple and/or diverse feedstocks using a universal feeder system.

The feeder system consists of one or more feed vessels attached to at least one live bottom dual screw feeder. In one embodiment, the feed vessel is rectangular shaped having three vertical sides and an angled side of no less than 60 degrees from the horizontal to facilitate proper flow of bio-feedstock materials that have different and/or variable flow properties. The vessel also provides for aeration mechanisms such as provided by inserting removable bridge breakers to safeguard flows. The biosolids are transferred from the live bottom dual screw feeder through a chute and into a secondary transfer screw feeder that conveys the material to a feed nozzle operably connected to a gasifier reactor. Various feedstocks may be transferred through the open bottom chute to the live bottom dual screw feeder and through another open bottom chute to the transfer screw feeder that conveys feedstock to the fuel feed inlets of the gasifier. The secondary transfer screw may be equipped with a coolant jacket to maintain a feed temperature between 60° F.-200° F. further expanding the types of feedstock that can be conveyed into a gasifier reactor.

An implementation in accordance with the teaching of the present disclosure may be used for receiving and conveying bio-feedstock materials into any bioreactor. The feeder system is specifically suitable for categories of waste currently being landfilled, that could be incinerated if permitting new incinerations were possible or that have restricted recycling options to safely and fully dispose of these waste materials. An implementation in accordance with the teaching of the present disclosure may be used by municipalities, landfill operators that clean up and rehabilitate land, waste generators, wastewater treatment facilities, agricultural waste generators, private waste service companies and entrepreneurs invested in renewable energy. Various implementations may also be used in analogous non-gasification processes to convey metered solids to storage tanks, for desegregation in recycling of waste.

An implementation in accordance with the teaching of the present disclosure may allow for standardizing equipment design and commoditization in the gasification industry by providing a path for simpler gasifier design with fewer equipment components. The universal feeder system may be used in open air, under ambient pressure and low temperature conditions. Where odor control is required, the systems can be fitted with a removable standard containment panel. In the case of biosolids, this design of the system may be a closed system from the feed bin into the gasifier to address odor control. Explosion panels are also optional for explosible dusts.

The present invention makes processing large volumes of feedstock in either a single- or multi-gasifier system and building large industrial facilities feasible and cost effective; replacing the current and commonly practiced use of multiple smaller units. More specifically, the present invention is universal feeder system that combines with a fluidized bed gasification reactor for the treatment of multiple diverse feedstocks including sewage sludge, municipal solid waste, wood waste, refuse derived fuels, automotive shredder residue and non-recyclable plastics. The invention thereby also illustrates a method of gasification for multiple and diverse feedstocks using a universal feeder system. The feeder system comprises one or more feed vessels and at least one live bottom dual screw feeder.

The feed vessel may be rectangular shaped having three vertical sides and an angled side of no less than 60 degrees from the horizontal to facilitate proper flow of feedstock material that have different and/or variable flow properties. The feedstocks may be transferred through an open bottom chute to a live bottom dual screw feeder and through another open bottom chute to a transfer screw feeder that conveys feedstock to the fuel feed inlets of a gasifier. The invention may be advantageously used by the biomass waste processing industry. For example, various implementations may standardize the capacity scale to a single design from 10-24 tpd day to more than 40 tpd and an average of over 100 tpd of feedstock that can be used at a single facility and retain the economies of scale. It also cooperatively can work with other standard large-scale supporting equipment such as driers, pollution control equipment and thermal handling equipment. This allows for standardized system and equipment design and commoditization.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A method comprising:
    (a) drying a wet coated seed material stream (1712) comprising an incoming wet granular biosolids stream (1702) to produce a moist air and uncontrolled size dried pellet stream (1722), using a dryer (1714);
    (b) separating an uncontrolled size dried pellet stream (1734) from the moist air and uncontrolled size dried pellet stream (1722), using a separator;
    (c) diverting a recycle portion of the uncontrolled size dried pellet stream (1738*b*) to a recycle feed bin (1744) disposed vertically above a pugmill (1706) from the uncontrolled size dried pellet stream (1734), using a diverter (1736), wherein the recycle portion of the uncontrolled size dried pellet stream (1738*b*) is dropped vertically into a chute to be metered into the pugmill (1706) and mix with the incoming wet granular biosolids stream (1702);
    (d) diverting a remainder portion of the uncontrolled size dried pellet stream (1738*c*) to an outlet, using the diverter (1736);
    (e) resizing oversized pellets from the recycle portion of the uncontrolled size dried pellet stream (1738*b*) to produce a controlled size dried seed material recycling stream (1754), using a variable speed rotary crusher (1750) configured with a screen (1820) having apertures (1845) sized to retain the oversized pellets in the variable speed rotary crusher (1750) until the oversized pellets are crushed to produce reduced size pellets that fall through the screen;
    (f) mixing the controlled size dried seed material recycling stream (1754) with new incoming wet granular biosolids (1703) from the incoming wet granular biosolids stream (1702) to replenish the wet coated seed material stream (1712), using the pugmill (1706); and
    (g) repeating steps a-f.

2. The method of claim 1, wherein the dryer (1714) is a rotary dryer.

3. The method of claim 1, wherein the separator further comprises a cyclone (1724).

4. The method of claim 1, wherein the dryer (1714) is configured to implement the separator based on configuring the dryer (1714) to permit the uncontrolled size dried pellet stream (1722) to drop out.

5. The method of claim 1, wherein the method further comprises mounting the variable speed rotary crusher (1750) inline and below the uncontrolled size dried pellet stream (1738*b*).

6. The method of claim 1, wherein the method further comprises adjusting speed of the variable speed rotary crusher (1750) to control pellet size in the controlled size dried seed material recycling stream (1754).

7. The method of claim 6, wherein the pellet size is controlled within a pellet size distribution predetermined to avoid screen (1820) blockage by oversize pellets and limit down time and throughput interruption for cleaning or adjusting the screen (1820).

8. The method of claim 1, wherein the uncontrolled size dried pellet stream (1722) further comprises Class A biosolids, and wherein the method further comprises diverting approximately 40% of the uncontrolled size dried pellet stream (1722) to be recycled.

9. The method of claim 1, wherein the method further comprises configuring the recycle portion of the uncontrolled size dried pellet stream (1738*b*) inline and vertically above an inlet of the variable speed rotary crusher (1750) to permit the oversized pellets to fall into the variable speed rotary crusher (1750) to be crushed to a size within a predetermined pellet size distribution.

10. The method of claim 1, wherein the method further comprises configuring the outlet to be operably coupled with a gasifier and diverting a portion of the remainder portion of the uncontrolled size dried pellet stream (1738*c*) to the gasifier.

11. The method of claim 1, wherein the method further comprises configuring the outlet to be operably coupled with a load out silo and diverting a portion of the remainder portion of the uncontrolled size dried pellet stream (1738*c*) to the load out silo.

12. The method of claim 1, wherein the method further comprises the screen (1820) having apertures (1845) sized to control top size of the controlled size dried seed material recycling stream (1754) to be from 3 to 5 mm in diameter.

13. The method of claim 1, wherein the method further comprises heating the dryer (1714) using hot air (1772) heated by a heat exchanger (1770) configured to be thermally coupled with a gasifier configured to have a gasifier operating temperature of at least 900° F.

14. The method of claim 13, wherein the method further comprises cooling moist air (1756) from the separator to produce a saturated air stream (1768), using a condenser (1762), and supplying the saturated air stream (1768) to the heat exchanger (1770) to be heated.

\* \* \* \* \*